United States Patent
Kim et al.

(10) Patent No.: US 10,247,978 B2
(45) Date of Patent: Apr. 2, 2019

(54) DISPLAY APPARATUS WITH MAIN BODY SUPPORTING IMAGE FORMING UNIT

(71) Applicant: SAMSUNG ELECTRONICS CO., LTD., Suwon-si (KR)

(72) Inventors: Sung Min Kim, Suwon-si (KR); Jeong Dong Noh, Suwon-si (KR); Jung Woo Hong, Suwon-si (KR); Jung Hyun Park, Suwon-si (KR); Duk Jin Jeon, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 14/962,593

(22) Filed: Dec. 8, 2015

(65) Prior Publication Data

US 2017/0059931 A1    Mar. 2, 2017

(30) Foreign Application Priority Data

Aug. 24, 2015 (KR) ......................... 10-2015-0118973

(51) Int. Cl.
*G02F 1/1333* (2006.01)
*G02F 1/1335* (2006.01)
*G02F 1/1345* (2006.01)

(52) U.S. Cl.
CPC .. *G02F 1/133528* (2013.01); *G02F 1/133512* (2013.01); *G02F 1/133605* (2013.01);
(Continued)

(58) Field of Classification Search
CPC combination set(s) only.
See application file for complete search history.

(56) References Cited

U.S. PATENT DOCUMENTS 6,819,376 B1    11/2004   Muramatsu
2004/0051827 A1 *  3/2004   Hinata ............... G02F 1/133528
                                                          349/113
(Continued)

FOREIGN PATENT DOCUMENTS

EP    0642-049  * 3/1994  ........... G02F 1/1333
EP    0642049     3/1995
(Continued)

OTHER PUBLICATIONS

Extended European Search Report dated Dec. 16, 2016 in European Patent Application No. 15200061.8.
(Continued)

*Primary Examiner* — Lauren Nguyen
(74) *Attorney, Agent, or Firm* — Staas & Halsey LLP

(57) ABSTRACT

A display apparatus including: a main body having an opening at the front part; a backlight unit configured to generate light; and an image forming unit provided in the front part of the main body, and configured to block or transmit the light generated by the backlight unit to create an image, where the image forming unit includes: a pair of transparent substrates disposed to be opposite to each other; a cable configured to transmit image data to the pair of transparent substrates; and a pair of polarizing films respectively disposed on the outer surfaces of the pair of transparent substrates, and wherein an edge part of at least one transparent substrate of the pair of transparent substrates protrudes to connect to the cable, and at least one polarizing film of the pair of polarizing films extends to the main body in a direction in which the at least one transparent substrate protrudes.

6 Claims, 22 Drawing Sheets

(52) U.S. Cl.
CPC .... *G02F 1/133606* (2013.01); *G02F 1/13452* (2013.01); *G02F 2001/133388* (2013.01); *G02F 2001/133531* (2013.01)

(56) References Cited

U.S. PATENT DOCUMENTS

| | | |
|---|---|---|
| 2006/0275989 A1 | 12/2006 | Ting et al. |
| 2012/0020001 A1 | 1/2012 | Mathew et al. |
| 2014/0043558 A1 | 2/2014 | Hwang et al. |
| 2014/0063433 A1* | 3/2014 | Benson ................. G02F 1/1341 349/155 |
| 2014/0347597 A1 | 11/2014 | Kim et al. |

FOREIGN PATENT DOCUMENTS

| | | |
|---|---|---|
| KR | 10-2012-0086788 | 8/2012 |
| KR | 10-2013-0035094 | 4/2013 |
| KR | 10-2015-0077582 | 7/2015 |

OTHER PUBLICATIONS

International Search Report dated May 25, 2016 in corresponding International Patent Application No. PCT/KR2015013151.
European Communication dated Sep. 14, 2017 in European Patent Application No. 15200061.8.

\* cited by examiner

DISPLAY APPARATUS WITH MAIN BODY SUPPORTING IMAGE FORMING UNIT

CROSS-REFERENCE TO RELATED APPLICATION

This application claims the benefit of Korean Patent Application No. 10-2015-0118973, filed on Aug. 24, 2015 in the Korean Intellectual Property Office, the disclosure of which is incorporated herein by reference.

BACKGROUND

1. Field

Embodiments of the present disclosure relate to a display apparatus, and more particularly, to a bezel-less display apparatus.

2. Description of the Related Art

A display apparatus is a kind of output device that converts acquired or stored electrical information into visual information, and displays the visual information for a user. The display apparatus is widely used in various fields including home appliances and industrial machines.

The display apparatus includes a monitor connected to a Personal Computer (PC) or a server computer, a portable computer device, a navigation system, a general Television (TV), an Internet Protocol Television (IPTV), a portable terminal (for example, a smart phone, a tablet PC, a Personal Digital Assistant (PDA), or a cellular phone), various kinds of displays used to reproduce advertisement films or movie films in industrial sites, and various kinds of audio/video systems.

The display apparatus can display still images or moving images using various kinds of display means. The display means includes Cathode Ray Tube (CRT), a Light-Emitting Diode (LED), an Organic Light-Emitting Diode (OLED), an Active-Matrix Light-Emitting Diode (AMLED), a liquid crystal, or electronic paper.

Generally, in the front edges of the display apparatus, a bezel is formed to fix the internal components of the display apparatus.

However, the bezel increases an area in which no image is displayed on the front surface of the display apparatus, and reduces a user's sense of immersion in images.

SUMMARY

Therefore, it is an aspect of the present disclosure to provide a bezel-less display apparatus.

It is another aspect of the present disclosure to provide a bezel-less display apparatus in which no internal components are shown to the outside.

It is still another embodiment of the present disclosure to provide a bezel-less display apparatus in which cables of connecting an image forming unit to a power/control unit are not shown to the outside.

Additional aspects of the disclosure will be set forth in part in the description which follows and, in part, will be obvious from the description, or may be learned by practice of the disclosure.

In accordance with one aspect of the present disclosure, a display apparatus includes: a main body having an opening at the front part; a backlight unit configured to generate light; and an image forming unit provided in the front part of the main body, and configured to block or transmit the light generated by the backlight unit in order to create an image, wherein the image forming unit includes: a pair of transparent substrates disposed to be opposite to each other; a cable configured to transmit image data to the pair of transparent substrates; and a pair of polarizing films respectively disposed on the outer surfaces of the pair of transparent substrates, and wherein an edge part of at least one transparent substrate of the pair of transparent substrates protrudes to connect to the cable, and at least one polarizing film of the pair of polarizing films extends to the main body in a direction in which the at least one transparent substrate protrudes.

The image forming unit may further include a subsidiary polarizing film disposed at an extended part of the at least one polarizing film.

A polarization direction of the subsidiary polarizing film may be vertical (or perpendicular) to a polarization direction of the at least one polarizing film.

The subsidiary polarizing film may be attached on a front surface or a rear surface of the extended part of the at least one polarizing film.

The image forming unit may further include a support material disposed on the extended part of the at least one polarizing film, and configured to support the at least one polarizing film.

The support material may fill space between a protruded part of the at least one substrate and the extended part of the at least one polarizing film.

The image forming unit may further include a dummy film disposed at an area which no cable contacts in a protruded part of the at least one transparent substrate.

The image forming unit may further include a shading material disposed at an extended part of the at least one polarizing film, and configured to block light.

The shading material may include a black ultraviolet curing agent.

The shading material may fill space between the extended part of the at least one polarizing film and the protruded part of the at least one transparent substrate.

The shading material may be applied on a surface of the extended part of the at least one polarizing film.

The image forming unit may further include a shading film disposed at an extended part of the at least one polarizing film, and configured to block light.

The shading film may include a black polymer film.

The shading film may be attached on a front surface or a rear surface of the extended part of the at least one polarizing film.

The image forming unit may further include a support material disposed at the extended part of the at least one polarizing film, and configured to support the at least one polarizing film.

In accordance with another aspect of the present disclosure, a display apparatus includes: a first transparent substrate and a second transparent substrate disposed to be opposite to each other; a liquid crystal layer disposed between the first transparent substrate and the second transparent substrate; a cable configured to transmit image data to the second transparent substrate; a first polarizing film disposed on an outer surface of the first transparent substrate; and a second polarizing film disposed on an outer surface of the second transparent substrate, wherein an edge part of the second transparent substrate protrudes to be connected to the cable, and the first polarizing film extends to at least a protruded width of the second transparent substrate in a direction in which the second transparent substrate protrudes.

The display apparatus may further include a third polarizing film disposed at an extended part of the first polarizing film.

A polarization direction of the third polarizing film may be vertical to a polarization direction of the first polarizing film.

The display apparatus may further include a shading material disposed at an extended part of the first polarizing film, and configured to block light.

The display apparatus may further include a shading film disposed at an extended part of the first polarizing film, and configured to block light.

In accordance with another aspect of the present disclosure, a display apparatus includes: a main body having an opening at the front part; and an image forming unit provided inside the main body, wherein the image forming unit includes: a first transparent substrate and a second transparent substrate disposed to be opposite to each other; a liquid crystal layer disposed between the first transparent substrate and the second transparent substrate; a cable configured to transmit image data to the second transparent substrate; a first polarizing film and a second polarizing film disposed on an outer surface of the first transparent substrate and an outer surface of the second transparent substrate, respectively; and a shading member positioned to correspond to the cable, and configured to prevent the cable from being exposed to the outside.

The shading member may include a third polarizing film and a fourth polarizing film, and a polarization direction of the third polarizing film may be vertical (or perpendicular) to a polarization direction of the fourth polarizing film.

The shading member may include a shading material to fill space between the main body and the image forming unit.

The shading material may include a black ultraviolet curing agent.

The shading member may include a shading film disposed between the main body and the image forming unit.

The shading film may include a black polymer film.

In accordance with another aspect of the present disclosure, an image forming unit of a display includes a pair of transparent substrates disposed opposite each other on each side of an LCD layer and at least one transparent substrate of the pair having a protruding edge, a cable connected to the protruding edge to transmit image data to the at least one transparent substrate of the pair having the protruding edge and a pair of polarizing films respectively disposed on outer surfaces of the pair of transparent substrates where at least one polarizing film of the pair of polarizing films extends in a direction in which the at least one transparent substrate protrudes.

The image forming unit may include an extended part of the at least one polarizing film has a subsidiary film with a polarization perpendicular to the polarization of the at least one polarizing film.

The image forming unit may provide for the cable to be visually obscured from a front of the unit of the display by the extending polarizing film.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Configurations illustrated in the embodiments and the drawings described in the present specification are only the preferred embodiments of the present disclosure, and thus it is to be understood that various modified examples, which may replace the embodiments and the drawings described in the present specification, are possible when filing the present application.

Figure 1:
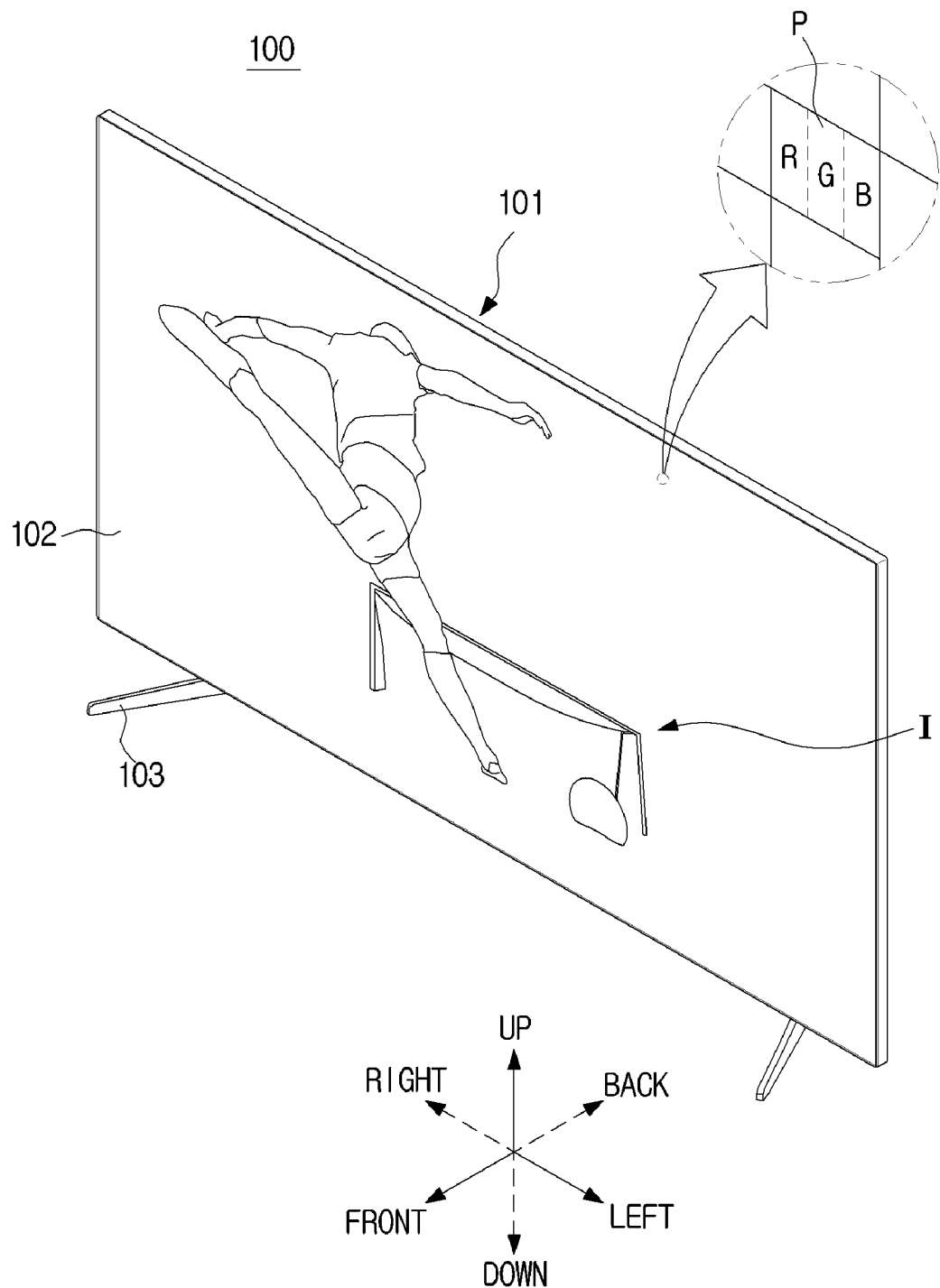
FIG. 1 shows an outer appearance of a display apparatus according to an embodiment of the present disclosure.

FIG. 1 shows an outer appearance of a display apparatus according to an embodiment of the present disclosure.

A display apparatus 100 is equipment for processing image signals received from the outside to visually display the processed signals as an image. In FIG. 1, an example in which the display apparatus 100 is television (TV) is shown, however, the display apparatus 100 is not limited to TV. For example, the display apparatus 100 may be one of various kinds of displays, such as a monitor, a portable multimedia device, and a portable communication device, which are capable of visually displaying images.

As shown in FIG. 1, the display apparatus 100 may include a main body 101, a screen 102 for displaying an image, and a supporter 103 connected to the lower part of the main body 101 to support the main body 101.

The main body 101 may form an outer appearance of the display apparatus 100, and include components to enable the display apparatus 100 to display images or to perform various functions. The main body 101 may be in the shape of a flat plate as shown in FIG. 1; however, the shape of the main body 101 is not limited to the flat plate. For example, the main body 101 may be in the shape of a curved plate whose center part is recessed.

The supporter 103 may connect to the lower part of the main body 101, and maintain the main body 101 at its stable position against a bottom surface. Also, selectively, the supporter 103 may connect to the back side of the main body 101, and firmly fix the main body 101 on a wall.

The supporter 103 shown in FIG. 1 may be in the shape of a bar protruding forward from the lower part of the main body 101. However, the shape of the supporter 103 is not limited to the bar shape shown in FIG. 1, and may have any other shape as long as it can support the main body 101 stably.

The screen 102 may be formed in the front side of the main body 101, and display images that are visual information. For example, the screen 102 may display a still image, a moving image, a 2Dimensional (2D) planar image, or a 3Dimensional (3D) stereoscopic image using a user's binocular disparity.

The screen 102 may include a plurality of pixels P, and the plurality of pixels P may emit light to form an image on the screen 102. Light emitted from the plurality of pixels P may be combined to form a still image, like mosaics, on the screen 102.

The individual pixels P may emit light of various brightness levels and various colors. In order to represent various colors, each pixel P may include a red pixel R, a green pixel G, and a blue pixel B.

The red pixel R may emit red light of various brightness levels, the green pixel G may emit green light of various brightness levels, and the blue pixel B may emit blue light of various brightness levels. The red light may be light corresponding to a wavelength region of about 620 nm (nanometer, $\frac{1}{1,000,000,000}$ m) to 750 nm, the green light may be light corresponding to a wavelength region of about 495 nm to 570 nm, and the blue light may be light corresponding to a wavelength region of about 450 nm to 495 nm.

Red light from the red pixel R, green light from the green pixel G, and blue light from the blue pixel B may be combined so that the pixel P can create light of various colors.

For example, the display apparatus 100 may include a red light source to emit red light, a green light source to emit green light, and a blue light source to emit blue light, wherein the red light source, the green light source, and the blue light source constitute a red pixel (R), a green pixel (G), and a blue pixel (B), respectively.

As another example, the display apparatus 100 may include a light source to emit white light including red light, green light, and blue light, and a color filter to selectively transmit red light, green light, and blue light. Also, a red filter to transmit red light, a green filter to transmit green light, and a blue filter to transmit blue light may constitute a red pixel R, a green pixel G, and a blue pixel B, respectively.

Hereinafter, the display apparatus 100 including the light source to emit white light and the color filter to selectively transmit red light, green light, and blue light will be described.

Figure 2:
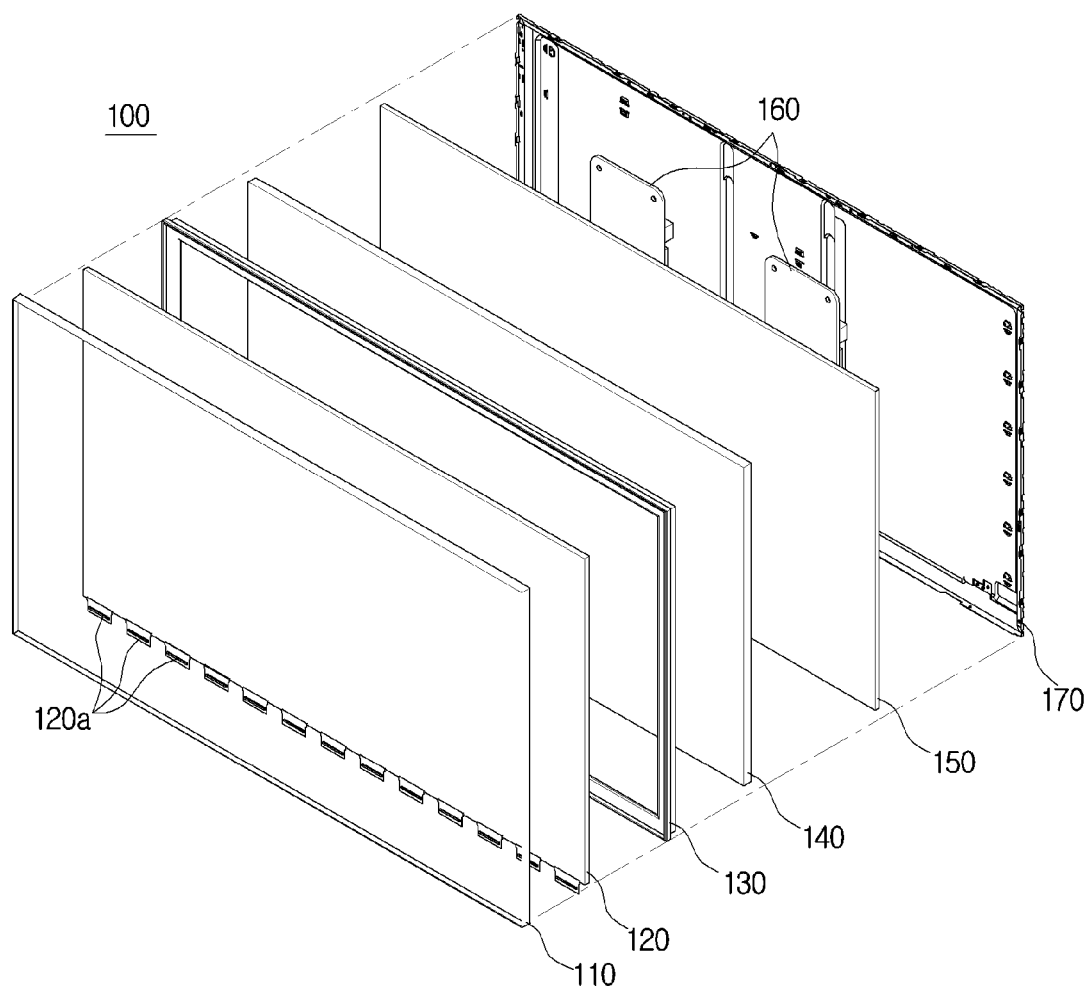
FIG. 2 is an exploded perspective view of the display apparatus shown in FIG. 1.

FIG. 2 is an exploded perspective view of the display apparatus 100 shown in FIG. 1.

As shown in FIG. 2, in the main body 101, various components to create images on the screen 102 may be installed.

More specifically, in the main body 101, a backlight unit 140 to emit surface light forward, an image forming unit 120 to create an image using light emitted from the backlight unit 140, and a power/control unit 160 to control overall operations of the backlight unit 140 and the image forming unit 120 may be installed. Also, the main body 101 may include a front chassis 110, a mold frame 130, a rear chassis 150, and a rear cover 170 to support and fix the image forming unit 110, the backlight unit 140, and the power/control unit 160.

The backlight unit 140 may include a plurality of point light sources to emit monochromatic light or white light, and refract, reflect, and scatter light emitted from the point light sources in order to convert the light into uniform surface light. As such, by refracting, reflecting, and scattering light, the backlight unit 140 can emit uniform surface light forward.

The configuration and functions of the backlight unit 140 will be described in more detail, below.

The image forming unit 120 may be provided in front of the backlight unit 140, and configured to block or transmit light emitted from the backlight unit 140 in order to form an image.

The front surface of the image forming unit 120 may form the screen 102 of the display apparatus 100, and be configured with a plurality of pixels P. The plurality of pixels P included in the image forming unit 120 may block or transmit light emitted from the backlight unit 140 independently, and light transmitted by the plurality of pixels P may create an image that the display apparatus 100 displays.

The image forming unit 120 may be a liquid crystal panel with optical properties changing according to an electric field.

The configuration and functions of the image forming unit 120 will be described in more detail, below.

The power/control unit 160 may include a power circuit unit (not shown) to supply power to the backlight unit 140 and the image forming unit 120, and a control circuit unit (not shown) to control operations of the backlight unit 140 and the image forming unit 120.

The power circuit unit may supply power to the backlight unit 140 to enable the backlight unit 140 to emit surface light, and supply power to the image forming unit 120 to enable the image forming unit 120 to transmit or block light.

Also, the control circuit unit may control power that is supplied to the backlight unit 140 in order to adjust the intensity of light that is emitted by the backlight unit 140, and may output image data to control the image forming unit 120 to form an image on the screen 102. The individual pixels P included in the image forming unit 120 may transmit or block light according to image data from the control circuit unit so as to display an image on the screen 102.

The power/control unit 160 may be configured with a Printed Circuit Board (PCB) and various circuits mounted on the PCB.

For example, the power circuit unit may include a power circuit composed of capacitors, coils, resistors, a microprocessor, etc., and a power circuit board on which the power circuit is mounted. Also, the control circuit unit may include a memory to store control programs and control data, a microprocessor to process control data according to a control program stored in a non-volatile memory, and a control circuit board on which the memory and the microprocessor are mounted.

Also, between the image forming unit 120 and the power/control unit 160, a plurality of cables 120a to transfer image data from the power/control unit 160 to the image forming unit 120 may be provided.

The cable 120a may be a flexible cable that can get bent when an external force is applied thereto. For example, the cable 120a may be a film cable, a Chip On Film (COF), or a Tape Carrier Packet (TCP). If the cable 120a is a COF or TCP, some circuits of the power/control unit 160 may be mounted on the cable 120a.

The front chassis 110 may be in the shape of a rectangular frame having an opening, and may fix the image forming unit 120, the mold frame 130, and the backlight unit 140, together with the rear chassis 150.

Particularly, the front chassis 110 according to an embodiment may include no bezel, and may support the image forming unit 120, the mold frame 130, the backlight unit 140, the rear chassis 150, and the rear cover 170 at the upper, lower, left, and right edges of the display apparatus 100.

Typically, a front chassis may fix an image forming unit together with a mold frame, and a bezel is formed on the front surface of the front chassis so that the edge parts of the image forming unit are not exposed to the outside. However, the bezel may increase an area at which no image is displayed on the front surface of the display apparatus, and reduce a user's sense of immersion in images.

The display apparatus 100 according to an embodiment of the present disclosure may remove such a bezel of the front chassis 110 to thereby minimize an area at which no image is displayed on the front surface of the display apparatus 100 and improve a user's sense of immersion in images.

The mold frame 130 may be disposed between the image forming unit 120 and the backlight unit 140, and separate the image forming unit 120 from the backlight unit 140 and fix them. More specifically, the mold frame 130 may fix the image forming unit 120, together with the front chassis 110, and fix the backlight unit 140, together with the rear chassis 150.

The rear chassis 150 may be disposed behind the backlight unit 140. Also, the rear chassis 150 may be in the shape of a thin box whose front part opens, and accommodate the image forming unit 120 and the backlight unit 140 therein.

Also, the power/control unit 160 may be fixed on the back surface of the rear chassis 150. For example, the PCB of the power/control unit 160 may be fixed on the back surface of the rear chassis 150 through fixing members such as bolts and nuts.

The rear cover 170 may be disposed at the rearmost part of the display apparatus 100, and prevent the power/control unit 160 from being exposed to the outside, while protecting the power/control unit 160 from an external force.

Hereinafter, the backlight unit 140 will be described.

The backlight unit 140 can be classified into a direct-type backlight unit and an edge-type backlight unit according to the position of light sources. In the direct-type backlight unit, light sources may be positioned at the back part of the backlight unit, and in the edge-type backlight unit, light sources may be positioned at the lateral sides of the backlight unit.

First, the direct-type backlight unit will be described below.

Figure 3:
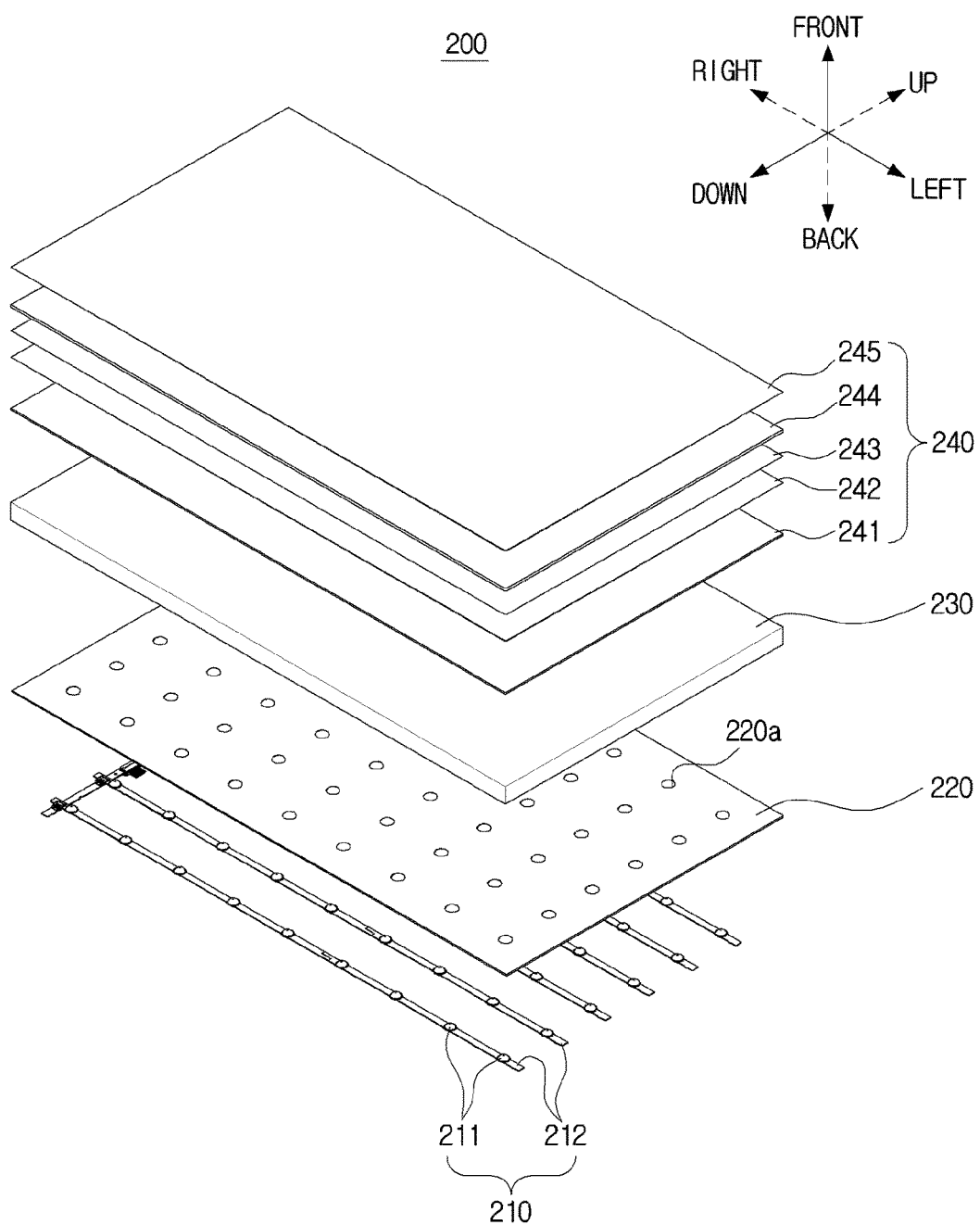
FIG. 3 is an exploded perspective view of an example of a backlight unit included in a display apparatus according to an embodiment of the present disclosure.
Figure 4:
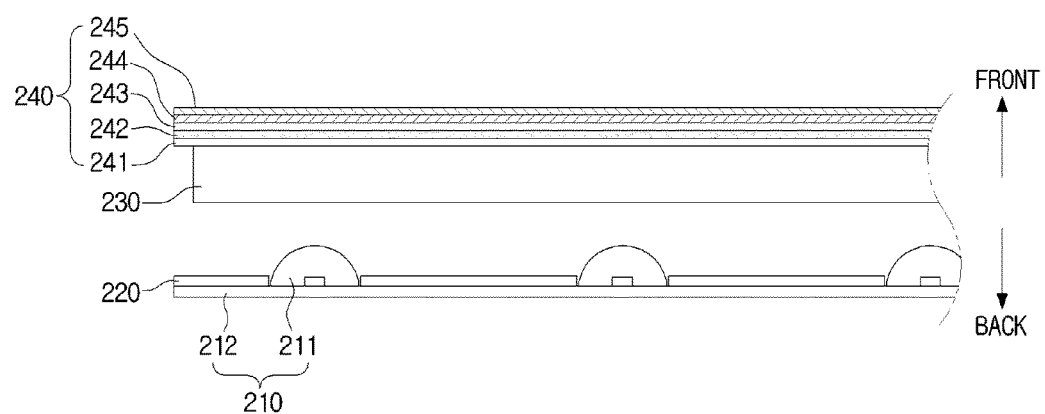
FIG. 4 is a cross-sectional view of the backlight unit shown in FIG. 3.

FIG. 3 is an exploded perspective view of an example of a backlight unit included in the display apparatus 100 according to an embodiment of the present disclosure, and FIG. 4 is a cross-sectional view of the backlight unit shown in FIG. 3.

As shown in FIGS. 3 and 4, a direct-type backlight unit 200 may include a light-emitting module 210 to generate light, a reflector sheet 220 to reflect light, a diffuser plate 230 to diffuse light, and an optical sheet 240 to improve the brightness of light.

The light-emitting module 210 may include a plurality of light sources 211 to emit light, and a supporter 212 to support and fix the plurality of light sources 211.

The plurality of light sources 211 may be arranged uniformly in the rearmost part of the backlight unit 200, as shown in FIG. 4, to emit light forward.

Also, the plurality of light sources 211 may be arranged in a predetermined pattern such that light emitted from the plurality of light sources 211 has uniform brightness as possible. More specifically, the plurality of light sources 211 may be arranged such that distances between neighboring light sources are the same.

For example, as shown in FIG. 4, the plurality of light sources 211 may be arranged in a matrix pattern such that four neighboring light sources form a square. As a result, each light source may be positioned adjacent to four light sources, and distances between the light source and its neighboring light sources may be the same.

As another example, the plurality of light sources 211 may be arranged in a plurality of rows, and a light source belonging to each row may be positioned to correspond to the mid-point between two neighboring light sources belonging to the adjacent row. As a result, the plurality of light sources 211 may be arranged such that three neighboring light sources form a regular triangle. Also, each light source may be positioned adjacent to six light sources such that distances between the light source and its adjacent six light sources are the same.

However, a pattern in which the plurality of light sources 211 are arranged is not limited to the above-described patterns. That is, the plurality of light sources 211 may be arranged in any other pattern as long as light emitted from the plurality of light sources 211 has uniform brightness.

The light sources 211 may be implemented as devices that can emit monochromatic light (light of a specific wavelength, for example, blue light) or white light (mixed light resulting from mixing light of various wavelengths) in all directions when power is supplied.

For example, the light sources 211 may be Light Emitting Diodes (LEDs) or Cold Cathode Fluorescence Lamps (CCFLs) having low heat generation.

In the case in which the light sources 211 emits white light, each light source 211 may include a blue light-emitting diode to emit blue light which is high energy light, and a Red/Green (RG) phosphor to absorb blue light to emit green light and red light. White light may be defined as mixed light resulting from mixing red light, green light, and blue light, or mixed light resulting from mixing blue light and yellow light.

Also, each light source 211 may include a blue light-emitting diode to emit blue light which is high energy light, and a Yellow (YAG) phosphor to absorb blue light to emit yellow light.

Also, each light source 211 may include a red light-emitting diode to emit red light, a green-emitting diode to emit green light, a blue light-emitting diode to emit blue light, and a light mixer to mix monochromatic light.

The supporter 212 may fix the plurality of light sources 211 so that the positions of the light sources 211 do not change. Also, the supporter 212 may supply power to the individual light sources 211 so that the light sources 211 can emit light.

Also, there may be provided a plurality of supporters 212 according to the arrangement of the plurality of light sources 211. For example, when the plurality of light sources 211 are arranged in rows, as shown in FIG. 3, the same number of supporters 212 as the number of the rows of the plurality of light sources 211 may be provided, and each supporter 212 may fix light sources 211 belonging to the row corresponding to the supporter 212.

The supporters 212 may be fabricated with a synthetic resin which fixes the plurality of light sources 211 and on which conductive power supply lines for supplying power to the light sources 211 are formed. Alternatively, the supporters 212 may be fabricated with a Printed Circuit Board (PCB).

The reflector sheet 220 may reflect light traveling backward from the backlight unit 200 to send the light in a forward or near-forward direction.

The reflector sheet 220 may include a plurality of through holes 220a in correspondence to the locations of the light sources 211 of the light-emitting module 210. Also, the light sources 211 of the light-emitting module 210 may pass through the through holes 220a and protrude from the reflector sheet 220, as shown in FIG. 4, so that the light sources 211 can emit light forward from the reflector sheet 220.

The reflector sheet 220 may be formed by coating a base material with a material having high reflectivity. For example, the reflector sheet 220 may be formed by coating a base material such as polyethylene terephthalate (PET) with polymer having high reflectivity.

The diffuser plate 230 may be provided in front of the light-emitting module 210 and the reflector sheet 220, and uniformly diffuse light emitted from the light sources 211 of the light-emitting module 210.

As described above, the light sources 211 may be positioned at regular intervals in the back part of the backlight unit 200. Although the light sources 211 are equally arranged or spaced in the back part of the backlight unit 200, non-uniform brightness distribution may occur according to the positions of the light sources 211.

The diffuser plate 230 may diffuse light emitted from the light sources 211 in order to remove non-uniform brightness distribution due to the light sources 211. In other words, the diffuser plate 230 may receive non-uniform light from the light sources 211, and emit uniform light forward. Particularly, the diffuser plate 230 may have a milky-white color so that the uniformity of brightness is not lost when light emitted from the light sources 211 directly passes through the diffuser plate 230.

The diffuser plate 230 may be configured with a core to transmit and diffuse light, and a pair of skins to protect the core and diffuse light. The core may be made of poly methyl methacrylate (PMMA) or polycarbonate (PC) containing a diffusing agent for light diffusion. The skins may be made of PMMA or PC containing a sunscreen composition for protecting the core.

The optical sheet 240 may include various sheets for improving brightness and the uniformity of brightness. More specifically, the optical sheet 240 may include a diffuser sheet 241, a first prism sheet 242, a second prism sheet 243, a double brightness enhancement film (DBEF) 244, and a protection sheet 245.

The diffuser sheet 241 may diffuse light in order to improve the uniformity of brightness. Light emitted from the light sources 211 may be diffused by the diffuser plate 230, and then again diffused by the diffuser sheet 241 included in the optical sheet 240.

The diffuser plate 230 and the diffuser sheet 241 may be used to remove non-uniform brightness distribution due to point light sources so that light having uniform brightness and uniform colors can be emitted through the entire screen 102 of the display apparatus 100.

Light passing through the diffuser sheet 241 may be diffused in a direction that is vertical to the surface of the diffuser sheet 241, thereby sharply reducing brightness.

The first and second prism sheets 242 and 243 may focus the light diffused by the diffuser sheet 241 to thereby increase brightness.

The first and second prism sheets 242 and 243 may include a plurality of prism patterns each having a trigonal prism shape, wherein the plurality of the prism patterns are arranged adjacent to each other to form a plurality of bands.

A direction in which the prism patterns of the first prism sheet 242 are arranged may be vertical to a direction in which the prism patterns of the second prism sheet 243 are arranged. For example, if the first prism sheet 242 is arranged in a left-right direction, the second prism sheet 243 may be arranged in an up-down direction.

Light passed through the first and second prism sheets 242 and 243 may have a viewing angle of about 70 degrees while having improved brightness, and travel toward the front part of the backlight unit 200.

The double brightness enhancement film 244, which is a kind of a polarizing film, is also called a reflective polarizing film. The double brightness enhancement film 244 may transmit a part of incident light, and reflect the remaining light. For example, the double brightness enhancement film 244 may transmit polarized light traveling in a predetermined polarization direction, and reflect polarized light traveling in different directions from the predetermined polarization direction.

Also, light reflected from the double brightness enhancement film 244 may be recycled in the inside of the backlight unit 200, and due to the recycling of light, the brightness of the display apparatus 100 may be improved.

The protection sheet 245 may protect the optical sheet 240 from external impacts or the inflow of foreign materials.

However, components included in the optical sheet 240 are not limited to the above-described sheets or films, and the optical sheet 240 may further include various sheets or films such as a protection sheet.

Also, the order in which the diffuser sheet 241, the first prism sheet 242, the second prism sheet 243, the double brightness enhancement film 244, and the protection sheet 245 are stacked is not limited to that as shown in FIG. 4.

As described above, the direct-type backlight unit 140 may emit surface light having uniform brightness forward.

The above description relates to the direct-type backlight unit in which light sources are positioned at the back part.

Hereinafter, the edge-type backlight unit in which light sources are positioned at the lateral sides will be described.

Figure 5:
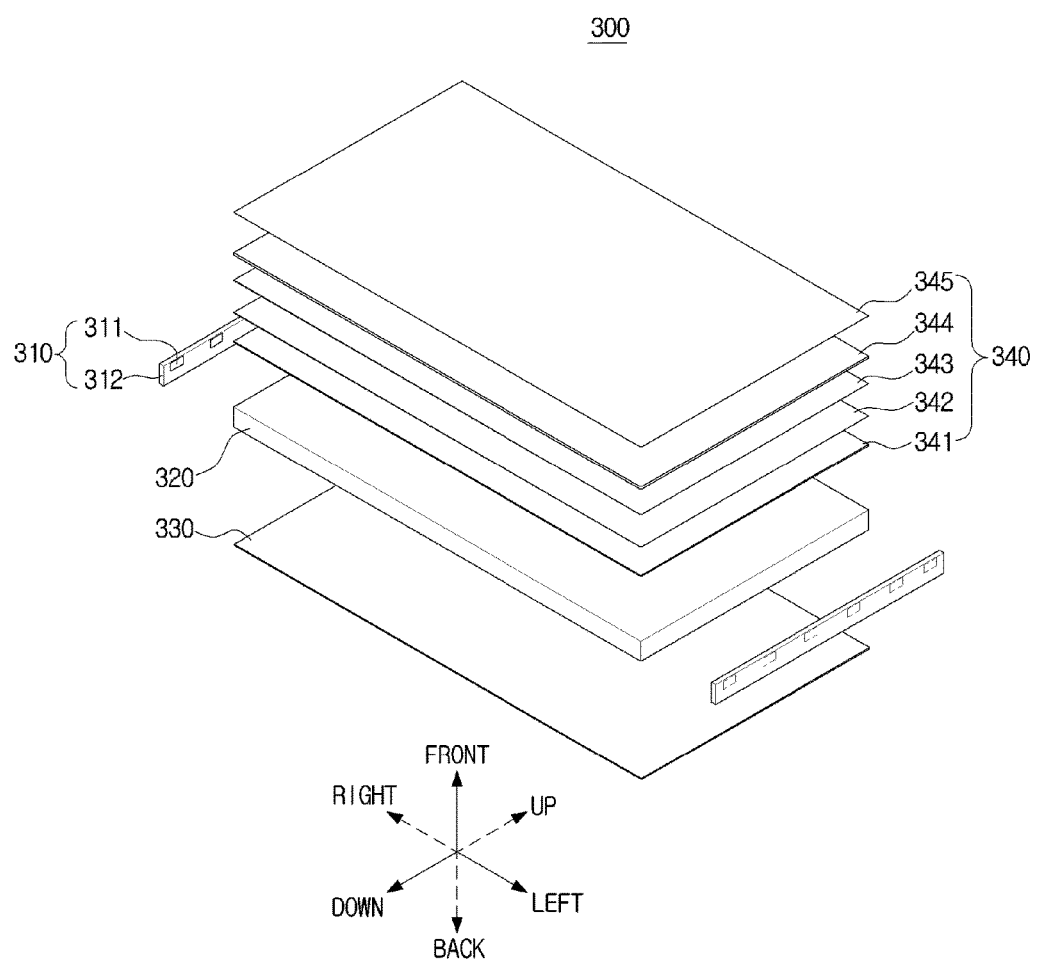
FIG. 5 is an exploded perspective view of another example of a backlight unit included in a display apparatus according to an embodiment of the present disclosure.
Figure 6:
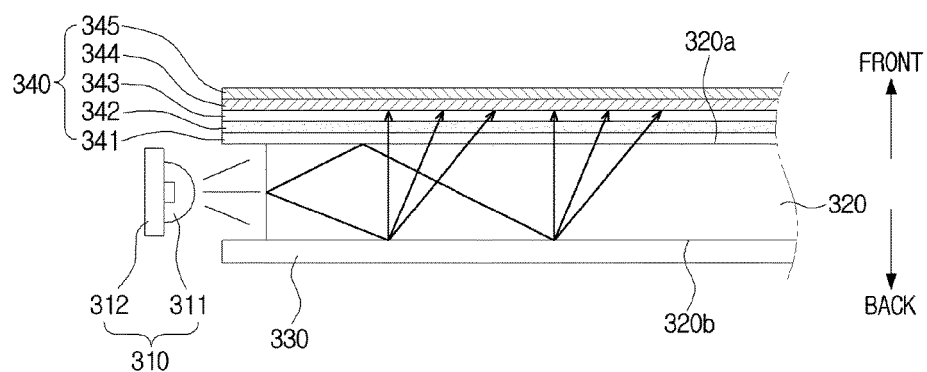
FIG. 6 is a cross-sectional view of the backlight unit shown in FIG. 5.

FIG. 5 is an exploded perspective view of another example of a backlight unit included in the display apparatus 100 according to an embodiment of the present disclosure, and FIG. 6 is a cross-sectional view of the backlight unit shown in FIG. 5.

As shown in FIGS. 5 and 6, an edge-type backlight unit 300 may include a light-emitting module 310 to generate light, a waveguide plate 320 to diffuse light, a reflector sheet 330 to reflect light, and an optical sheet 340 to improve the brightness of light.

The light-emitting module 310 may include a plurality of light sources 311 to emit light, and a supporter 312 to support and fix the plurality of light sources 311.

The plurality of light sources 311 may be arranged at regular intervals in the lateral sides of the backlight unit 300, and may emit light toward the center of the backlight unit 300, as shown in FIG. 5.

The plurality of light sources 311 may be equally arranged so that light emitted by the plurality of light sources 311 has uniform brightness as possible.

For example, as shown in FIG. 5, the plurality of light sources 311 may be equally arranged in the left and right lateral sides of the backlight unit 300. However, the light sources 311 may be arranged in any one of the left and right lateral sides of the backlight unit 300.

The light sources 311 may be implemented as devices that can emit monochromatic light (light of a specific wavelength, for example, blue light) or white light (light obtained by mixing light of various wavelengths) in all directions when power is supplied.

For example, the light sources 311 may be implemented as LEDs or CCFLs having low heat generation.

In the case in which the light sources 311 emits white light, each light source 311 may include a blue light-emitting diode to emit blue light which is high energy light, and a R/G phosphor to absorb blue light to emit green light and red light. Also, each light source 311 may include a blue light-emitting diode to emit blue light which is high energy light, and a YAG phosphor to absorb blue light to emit yellow light.

Also, each light source 311 may include a red light-emitting diode to emit red light, a green-emitting diode to emit green light, a blue light-emitting diode to emit blue light, and a light mixer to mix monochromatic light.

The supporter 312 may fix the plurality of light sources 311 so that the positions of the light sources 311 do not change. Also, the supporter 312 may supply power to the individual light sources 311 so that the light sources 311 can emit light.

The supporter 312 may be disposed, together with the light sources 311, in the lateral sides of the backlight unit 300. For example, as shown in FIG. 5, two supporters 312 may be disposed in the left and right lateral sides of the backlight unit 300. However, one supporter 312 may be disposed in any one of the left and right lateral sides of the backlight unit 300.

The supporter 312 may be fabricated with a synthetic resin which fixes the plurality of light sources 311 and on which conductive power supply lines for supplying power to the light sources 311 are formed. Alternatively, the supporter 312 may be fabricated with a PCB.

The waveguide plate 320 may change the traveling direction of light incident to the lateral surfaces from the light sources 311 so as to emit the light forward. Also, the waveguide plate 320 may diffuse light incident from the light sources 311, and then emit the diffused light through the front surface 320a.

In order to diffuse light to change the traveling direction of light, a plurality of convex stripes may be formed on the front surface 320a of the waveguide plate 320, and a plurality of dots may be formed on the rear surface 320b of the waveguide plate 320. Also, the size and interval of the convex stripes and dots may be adjusted such that uniform light can exit the front surface 320a of the waveguide plate 320. Also, the convex stripes formed on the front surface 320a of the waveguide plate 320 may be embossed by a printing method, and the dots formed on the rear surface 320b of the waveguide plate 320 may be engraved using laser.

Since the light sources 311 are arranged in both lateral sides of the backlight unit 300, as described above, non-uniform brightness distribution may occur due to the positions of the light sources 311.

The waveguide plate 320 may diffuse light emitted from the light sources 311 in order to remove non-uniform brightness distribution due to the light sources 311. Particularly, the waveguide plate 320 may have a milky-white color so that the uniformity of brightness is not lost when light emitted from the light sources 311 directly passes through the waveguide plate 320.

The light incident to the inside of the waveguide plate 320 may travel in various directions according to the incident angle. For example, light incident toward the front of the waveguide plate 320 may be reflected from the front surface 320a of the waveguide plate 320 and then proceed toward the rear surface 320b of the waveguide plate 320, or may be refracted from the front surface 320a of the waveguide plate 320 and then incident to the optical sheet 340. Also, light incident toward the back of the waveguide plate 320 may be reflected from the rear surface 320b of the waveguide plate 320 or scattered by the dots formed on the rear surface 320b of the waveguide plate 320 and then proceed toward the front surface 320a of the waveguide plate 320.

Due to light reflection generated in the front and rear surfaces 320a and 320b of the waveguide plate 320, light incident to the lateral surfaces of the waveguide plate 320 may proceed to the center area of the waveguide plate 320. Also, due to light scattering generated in the rear surface 320b of the waveguide plate 320 and light refraction generated in the front surface 320a of the waveguide plate 320, light incident to the inside of the waveguide plate 320 may be emitted from the front surface 320a of the waveguide plate 320.

The waveguide plate 320 may be fabricated with PMMA or PC.

The reflector sheet 330 may reflect light traveling backward from the backlight unit 300 to send the light in a forward or near-forward direction.

The reflector sheet 330 may reflect light exiting the rear surface 320b of the waveguide plate 320 to make the light incident to the waveguide plate 320.

The reflector sheet 330 may be formed by coating a base material with a material having high reflectivity. For example, the reflector sheet 330 may be formed by coating a base material such as PET with polymer having high reflectivity.

The optical sheet 340 may include various sheets for improving brightness or the uniformity of brightness. More specifically, the optical sheet 340 may include a diffuser sheet 341, a first prism sheet 342, a second prism sheet 343, a selective light absorption sheet 344, and a double brightness enhancement film (DBEF) 345.

The diffuser sheet 341 may diffuse light to improve the uniformity of brightness. Light emitted from the light sources 311 may be diffused by the waveguide plate 320 and then again diffused by the diffuser sheet 341 included in the optical sheet 340.

Light passed through the diffuser sheet 341 may be diffused in a direction that is vertical to the surface of the diffuser sheet 341, thereby sharply reducing brightness.

The first and second prism sheets 342 and 343 may focus the light diffused by the diffuser sheet 341 to thereby increase brightness.

The first and second prism sheets 342 and 343 may include a plurality of prism patterns each having a trigonal prism shape, wherein the plurality of the prism patterns are arranged adjacent to each other to form a plurality of bands. A direction in which the prism patterns of the first prism sheet 342 are arranged may be vertical to a direction in which the prism patterns of the second prism sheet 343 are arranged.

Light passed through the first and second prism sheets 342 and 343 may have a viewing angle of about 70 degrees while having improved brightness, and travel toward the front of the backlight unit 300.

The double brightness enhancement film 345, which is a kind of a polarizing film, is also called a reflective polarizing film. The double brightness enhancement film 345 may transmit a part of incident light and reflect the remaining light. For example, the double brightness enhancement film 345 may transmit polarized light traveling in a predetermined polarization direction, and reflect polarized light traveling in different directions from the predetermined polarization direction.

Also, light reflected from the double brightness enhancement film 345 may be recycled in the inside of the backlight unit 300, and due to the recycling of light, the brightness of the display apparatus 100 may be improved.

The protection sheet 345 may protect the optical sheet 340 from external impacts or the inflow of foreign materials.

However, components included in the optical sheet 340 are not limited to the above-described sheets or films, and the optical sheet 340 may further include various sheets or films such as a protection sheet.

Also, the order in which the diffuser sheet 341, the first prism sheet 342, the second prism sheet 343, the double brightness enhancement film 344, and the protection sheet 345 are stacked is not limited to that as shown in FIG. 6.

As described above, the edge-type backlight unit 300 may emit surface light having uniform brightness forward.

The above description relates to a backlight unit of generating uniform surface light.

Hereinafter, an image forming unit that transmits or blocks light emitted from a backlight unit to create an image will be described.

Figure 7:
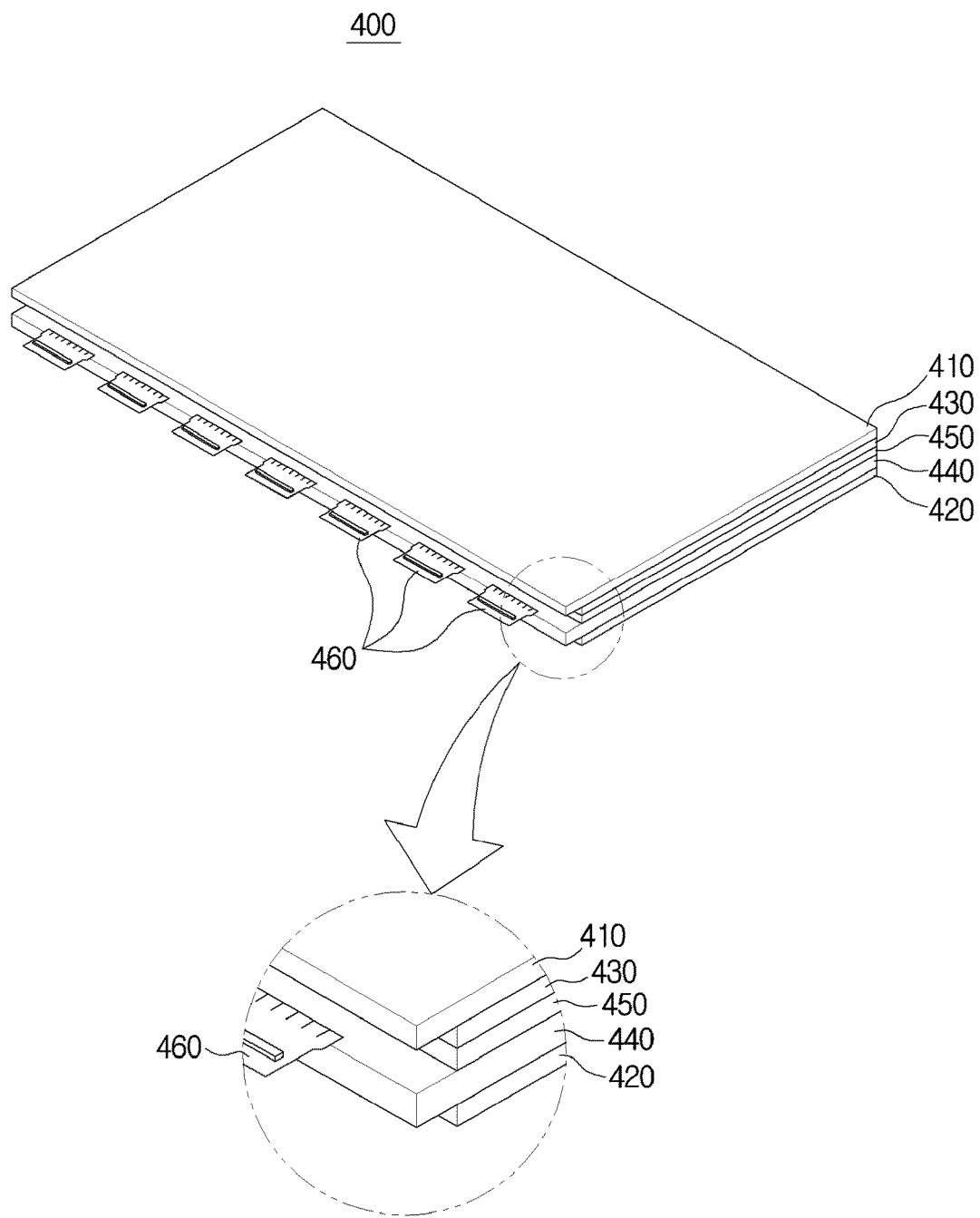
FIG. 7 shows an image forming unit according to an embodiment of the present disclosure.
Figure 8:
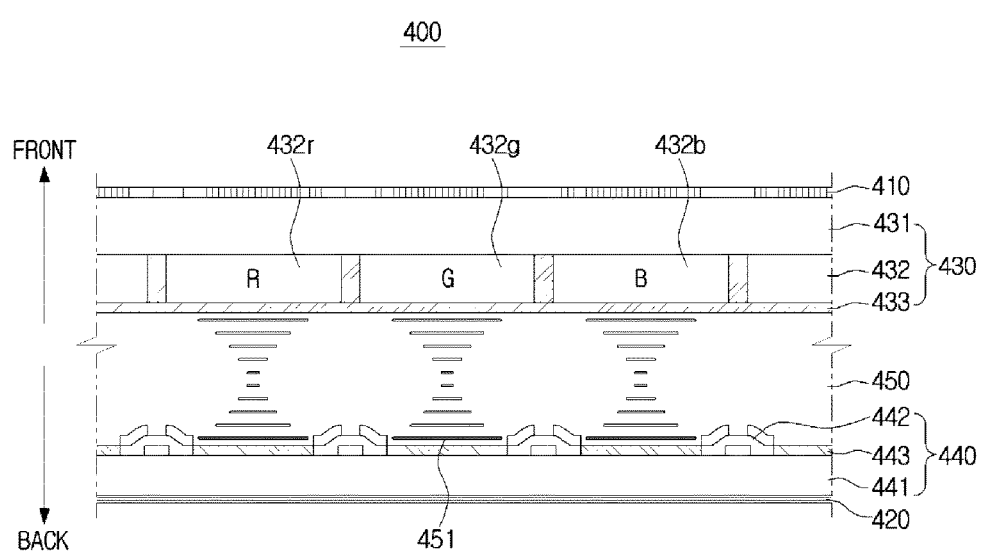
FIG. 8 is a cross-sectional view of a pixel included in the image forming unit shown in FIG. 7.

FIG. 7 shows an image forming unit according to an embodiment of the present disclosure, and FIG. 8 is a cross-sectional view of a pixel included in the image forming unit shown in FIG. 7.

Referring to FIGS. 7 and 8, an image forming unit 400 according to an embodiment of the present disclosure will be described.

The image forming unit 400 may include a first polarizing film 410, a second polarizing film 420, a first transparent plate 430, a second transparent plate 440, and a liquid crystal layer 450. The first polarizing film 410, the second polarizing film 420, the first transparent plate 430, the second transparent plate 440, and the liquid crystal layer 450 may be stacked in the order of the second polarizing film 420, the second transparent plate 440, the liquid crystal layer 450, the first transparent plate 430, and the first polarizing film 410, from the back, as shown in FIG. 7.

The first transparent plate 430 may be opposite to the second transparent plate 440, and the first polarizing film 410 and the second polarizing film 420 may be disposed on the outer surface of the first transparent plate 430 and the outer surface of the second transparent plate 440, respectively.

Each of the first and second polarizing films 410 and 420 may transmit light traveling in a predetermined polarization direction and block light traveling in different directions from the predetermined polarization direction.

Light may be composed of a pair of an electric field and a magnetic field vibrating in a direction that is vertical to the traveling direction of the light. The electric field and the magnetic field may vibrate in all directions that are vertical to the traveling direction of the light.

A phenomenon in which an electric field or a magnetic field vibrates in a specific direction is called polarization, and a direction in which the electric field or the magnetic field vibrates is referred to as a polarization direction.

Also, a film to transmit light including an electric field or a magnetic field vibrating in a predetermined direction and block light including an electric field and a magnetic field vibrating in the other directions among light including electric fields and magnetic fields vibrating in arbitrary directions is called a polarizing film.

In other words, a polarizing film may transmit light vibrating in a predetermined polarization direction, and block light vibrating in the other directions.

The first polarizing film 410 may transmit light vibrating in a first polarization direction, and block light vibrating in the other directions. Also, the second polarizing film 420 may transmit light vibrating in a second polarization direction, and block light vibrating in the other directions.

Also, the first polarization direction may be vertical (or perpendicular) to the second polarization direction. In other words, the polarization direction of light transmitted through the first polarizing film 410 may be vertical to the polarization (or perpendicular) direction of light transmitted through the second polarizing film 420. As a result, light cannot be transmitted through both the first polarizing film 410 and the second polarizing film 420 at the same time.

The liquid crystal layer 450 may be provided between the first transparent plate 430 and the second transparent plate 440, and may be filled with the liquid crystal molecules 451.

Liquid crystal means an intermediate state between a solid (crystal) state and a liquid state. When a material in a solid state is heated, the material changes from the solid state to a transparent liquid state at its melting temperature. However, when a liquid crystal material in a solid state is heated, the liquid crystal material changes to an opaque, turbid liquid at its melting temperature, and then changes to a transparent liquid state. The term "liquid crystal" represents a liquid crystal state which is an intermediate state between a solid state and a liquid state, or represents a material in a liquid crystal state.

Most of liquid crystal materials are organic compounds. A molecule of a liquid crystal material is in the shape of a thin rod. Also, the molecular arrangement of the liquid crystal material is irregular when seen in a specific direction, but appears as a regular crystalloid pattern when seen in another direction. Accordingly, the liquid crystal has both the fluidity of a liquid and the optical anisotropy of a solid.

Also, the liquid crystal shows optical properties according to a change of an electric field. For example, the liquid crystal may change the orientation of the molecular arrangement according to a change of an electric field.

For example, if an electric field is formed in the liquid crystal layer 450, the liquid crystal molecules 451 of the liquid crystal layer 450 may be aligned according to the direction of the electric field, and if no electric field is formed in the liquid crystal layer 450, the liquid crystal molecules 451 may be twisted due to orientation layers (not shown) formed on the inner surfaces of the first transparent plate 430 and the second transparent plate 440.

More specifically, a direction in which the liquid crystal molecules 451 are aligned by the orientation layer of the first transparent plate 430 may be vertical to a direction in which the liquid crystal molecules 451 are aligned by the orientation layer of the second transparent plate 440. Accordingly, when no electric field is formed in the liquid crystal layer 450, the liquid crystal molecules 451 located near the first transparent plate 430 may be arranged vertically with respect to the liquid crystal molecules 451 located near the second transparent plate 440 so that the liquid crystal molecules 451 are twisted by 90 degrees or 270 degrees in the inside of the liquid crystal layer 450.

As such, since the molecular arrangement of the liquid crystal molecules 451 changes according to existence/absence of an electric field, the optical properties of the liquid crystal layer 450 may also change according to existence/absence of an electric field in the liquid crystal layer 450.

For example, when an electric field is formed in the liquid crystal layer 450, light polarized by the second polarizing film 420 cannot pass through the first polarizing film 410 due to the arrangement of the liquid crystal molecules 451 in the liquid crystal layer 450. In other words, when an electric field is formed in the liquid crystal layer 450, light may be blocked by the first polarizing film 410 and the second polarizing film 420.

Meanwhile, when no electric field is formed in the liquid crystal layer 450, light polarized by the second polarizing film 420 can pass through the first polarizing film 410 due to the arrangement of the liquid crystal molecules 451 in the liquid crystal layer 450. In other words, when no electric field is formed in the liquid crystal layer 450, light may be transmitted through both the first polarizing film 410 and the second polarizing film 420.

As described above, when no electric field is formed in the liquid crystal layer 450, the liquid crystal molecules 451 of the liquid crystal layer 450 may be twisted by 90 degrees or 270 degrees, and a polarization direction of light polarized by the second polarizing film 420 may also rotate by 90 degrees or 270 degrees according to the arrangement of the liquid crystal molecules 451. As a result, a polarization direction of light passed through the liquid crystal layer 450 may become the same as the polarization direction of the first polarizing film 410.

As such, the liquid crystal layer 450 may change its optical properties according to existence/absence of an electric field.

As described above, the first transparent plate 430 may be opposite to the second transparent plate 440.

The first transparent plate 430 may include a first transparent substrate 431, a color filter 432, and a transparent common electrode 433, and the second transparent plate 440 may include a second transparent substrate 441, a plurality of thin-film transistors 442, and a plurality of transparent pixel electrodes 443.

The first and second transparent substrates 431 and 441 may be made of tempered glass or a transparent film.

The color filter 432 may be disposed on the inner surface of the first transparent substrate 431.

The color filter 432 may include a red filter 432r to selectively transmit red light, a green filter 432g to selectively transmit green light, and a blue filter 432b to selectively transmit blue light. The red filter 432r, the green filter 432g, and the blue filter 432b may be arranged side by side, as shown in FIG. 8.

The color filter 432 may transmit light of a specific color (that is, light of a specific wavelength region) among white light emitted from the backlight unit 140 (see FIG. 2), and block the other light. For example, the red filter 432r may transmit red light, and block the other light. Also, the green filter 432g may transmit green light, and block the other light, and the blue filter 432b may transmit blue light, and block the other light.

Also, the color film 432 may be formed to correspond to each pixel P. More specifically, the red film 432r may be formed to correspond to the red pixel R, the green film 432g may be formed to correspond to the green pixel G, and the blue film 452b may be formed to correspond to the blue pixel B.

In other words, the red pixel R may emit red light by the red filter 432r, the green pixel G may emit green light by the green filter 432g, and also, the blue pixel B may emit blue light by the blue filter 432b.

Also, red light emitted by the red pixel R, green light emitted by the green pixel B, and blue light emitted by the blue pixel B may be combined so that the pixel P can emit light of various colors.

The transparent common electrode 433 may be disposed on the inner surface of the color filter 432.

The transparent common electrode 433 may create a reference potential to form an electric field in the liquid crystal layer 450. For example, the transparent common electrode 433 may be grounded.

The transparent common electrode 433 may be formed with a transparent material having low electrical resistance and light transmittance, through which electricity can flow and light can be transmitted.

For example, the transparent common electrode 433 may be formed with Indium Tin Oxide (ITO), Indium Zinc Oxide (IZO), Ag nano wire, carbon nano tube (CNT), graphene, or 3,4-ethylenedioxythiophene (PEDOT).

The thin-film transistors 442 may be arranged on the inner surface of the second transparent substrate 441.

The thin-film transistors 442 may control current that is supplied to the pixel electrodes 443.

More specifically, if the thin-film transistors 442 are turned on (activated or closed), current may flow to/from the transparent pixel electrodes 443 according to image data. As a result, the potential of the transparent pixel electrodes 443 may increase or decrease so that an electric field is formed or removed between the transparent pixel electrodes 443 and the transparent common electrode 433.

For example, when image data "1" is input and the thin-film transistors 442 are turned on, an electric field may be formed between the transparent pixel electrodes 443 and the transparent common electrode 433. Also, when image data "0" is input and the thin-film transistors 442 are turned on, an electric field formed between the transparent pixel electrodes 443 and the transparent common electrode 433 may be removed.

Also, when the thin-film transistors 442 are turned off (deactivated or opened), the flow of current to the transparent pixel electrodes 443 may be blocked. As a result, the potential of the transparent pixel electrodes 443 may be maintained so that a state in which an electric field is formed between the transparent pixel electrodes 443 and the transparent common electrode 433 may be maintained or a state in which no electric field is formed between the transparent pixel electrodes 443 and the transparent common electrode 433 may be maintained.

For example, if the thin-film transistors 442 are turned off when image data "1" is input, a state in which an electric field is formed between the transparent pixel electrodes 443 and the transparent common electrode 433 may be maintained. Also, if the thin-film transistors 442 are turned off when image data "0" is input, a state in which no electric field is formed between the transparent pixel electrodes 443 and the transparent common electrode 433 may be maintained.

The thin-film transistors 442 may be made of poly-silicon, and may be fabricated using a semiconductor process, such as lithography, deposition, or ion implantation.

As a result, the thin-film transistors 442 cannot transmit light, unlike the transparent pixel electrodes 443 and the transparent common electrode 433. Accordingly, the thin-film transistors 442 may be disposed between the color filters 432r, 432g, and 432b. In other words, the thin-film transistors 442 may be disposed between the color pixels R, G, and B.

Each transparent pixel electrode 443 may be disposed between two neighboring thin-film transistors 442.

As described above, the transparent pixel electrodes 443 may be electrically connected to the thin-film transistors 442, and the potential of the transparent pixel electrodes 443 may change according to image data. As a result, a potential difference may be made between the transparent pixel electrodes 443 and the transparent common electrode 433 according to the image data, and due to the potential difference between the transparent pixel electrodes 443 and the transparent common electrode 433, an electric field may be formed between the transparent pixel electrodes 443 and the transparent common electrode 433.

The electric field formed between the transparent pixel electrodes 443 and the transparent common electrode 433 may change the arrangement of the liquid crystal molecules 451 in the liquid crystal layer 450.

Also, the transparent pixel electrodes 443 may be disposed in correspondence to the locations of the color filters 432r, 432g, and 432b, as shown in FIG. 8. As a result, electric fields may be formed at areas of the liquid crystal layer 450 corresponding to the locations of the color filters 432r, 432g, and 432b so as to change the optical properties of the areas of the liquid crystal layer 450 corresponding to the locations of the color filters 432r, 432g, and 432b.

In other words, the image forming unit 400 may transmit or block light at areas corresponding to the locations of the color filters 432r, 432g, and 432b. Also, when light is transmitted at the areas corresponding to the locations of the color filters 432r, 432g, and 432b, light of colors corresponding to the color filters 432r, 432g, and 432b may be emitted.

As described above, the inner surface of the first transparent plate 430 may be opposite to the inner surface of the second transparent plate 440, and the liquid crystal layer 450 may be provided between the first transparent plate 430 and the second transparent plate 440. Also, the first polarizing film 410 and the second polarizing film 420 may be respectively attached on the outer surface of the first transparent plate 430 and the outer surface of the second transparent plate 440.

Also, the first transparent plate 430 may include the color filters 432 and the transparent common electrode 433, the second transparent plate 440 may include the thin-film transistors 442 and the transparent pixel electrodes 443, and an electric field may be formed in the liquid crystal layer 450 between the transparent pixel electrodes 443 and the transparent common electrode 433.

At one edge of the second transparent plate 440, a plurality of cables 460 may be disposed to provide image data to the thin-film transistors 442 and the transparent pixel electrodes 443, as shown in FIG. 7.

One ends of the cables 460 may be connected to the second transparent plate 440 of the image forming unit 400, and the other ends of the cables 460 may be connected to the power/control unit 160 (see FIG. 2).

The cables 460 may transfer image data output from the power/control unit 160 (see FIG. 2) to the second transparent plate 440 of the image forming unit 400, so that the transparent pixel electrodes 443 and the thin-film transistors 442 of the second transparent plate 440 can form an electric field in the liquid crystal layer 450 according to the image data.

The cable 460 may be a flexible cable that can get bent when an external force is applied thereto. For example, the cable 460 may be a film cable, a COF, or a TCP. If the cable 460 is a COF or TCP, some circuits of the power/control unit 160 may be mounted on the cable 460.

Also, the second transparent plate 440 may protrude downward rather than the first transparent plate 430 and the liquid crystal layer 450, as shown in FIG. 7, and may be connected to the cables 460 at the protruded part.

Since the front chassis 110 (see FIG. 2) included in the display apparatus 100 (see FIG. 2) according to an embodiment of the present disclosure includes no bezel, the second transparent plate 440 protruding downward and the cables 460 connected to the second transparent plate 440 may be shown to a user.

In order to prevent a part of the second transparent plate 440 and a part of the cables 46 from being shown to a user, the first polarizing film 410 located at the front most part of the image forming unit 400 may extend downward.

Hereinafter, the protruding of the second transparent plate 440 and the extending of the first polarizing film 410 will be described in more detail with reference to the accompanying drawings.

Figure 9:
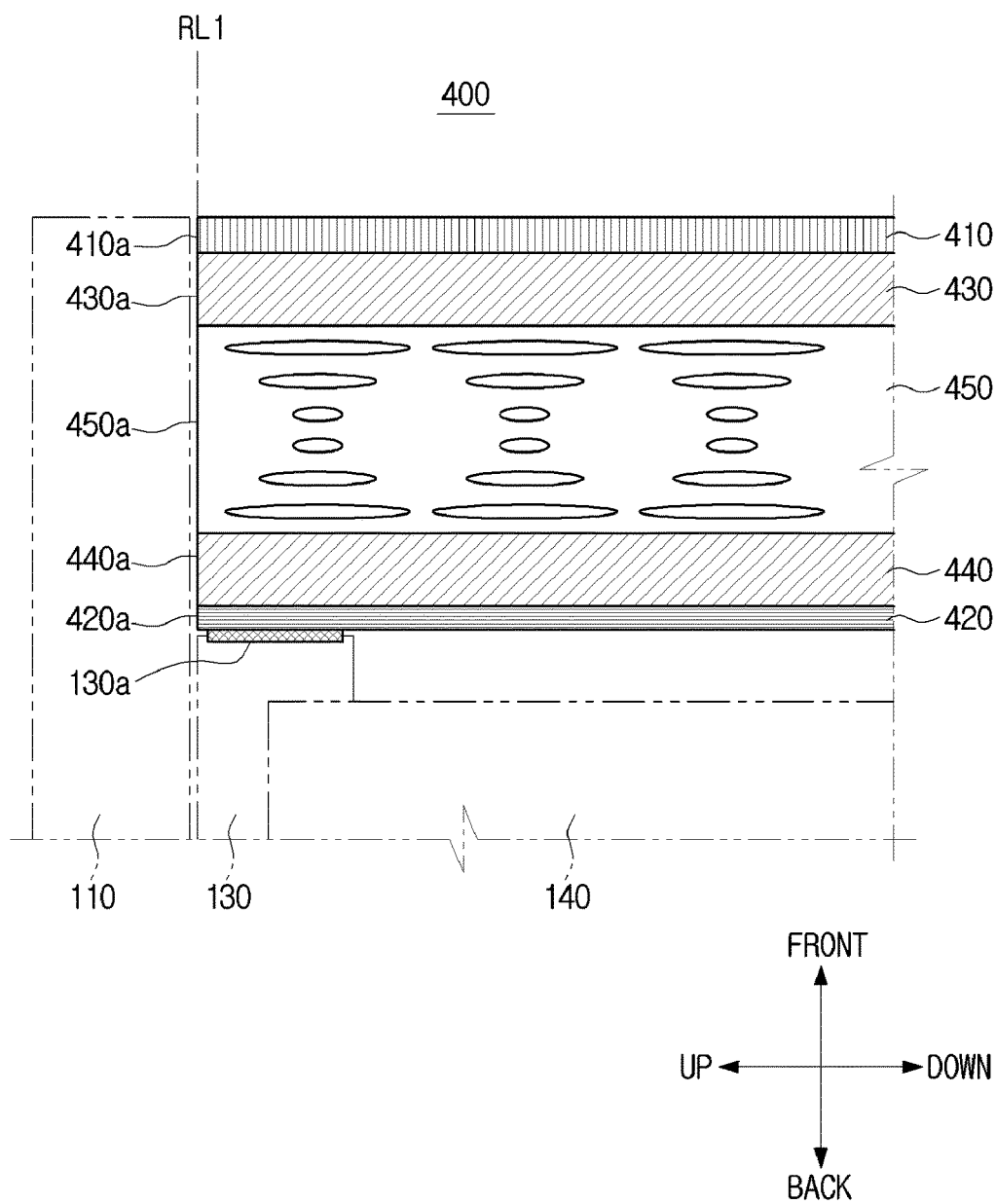
FIG. 9 is a cross-sectional view of the upper edge part of the image forming unit shown in FIG. 7.
Figure 10:
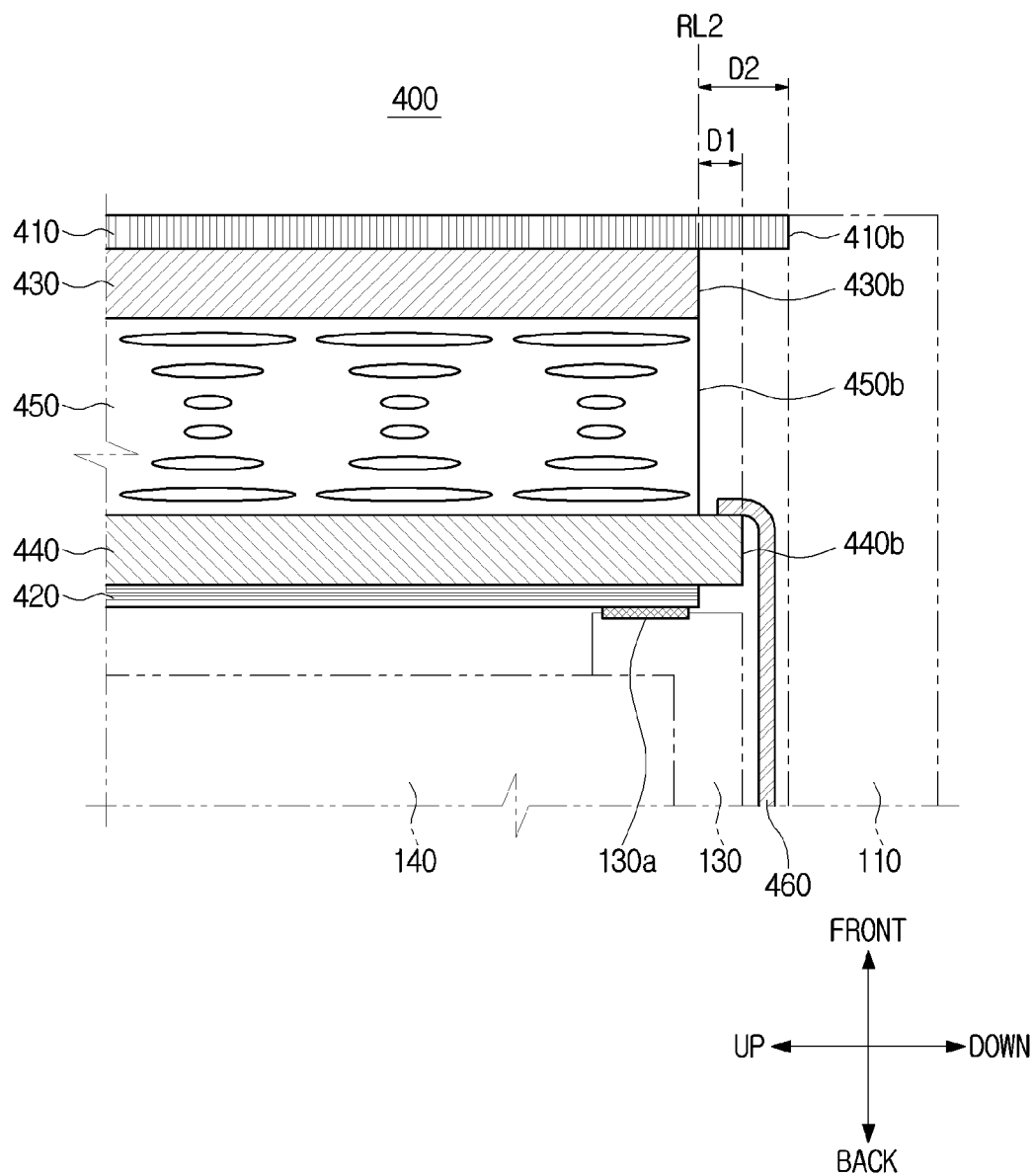
FIG. 10 is a cross-sectional view of the lower edge part of the image forming unit shown in FIG. 7.

FIG. 9 is a cross-sectional view of the upper edge part of the image forming unit 400 shown in FIG. 7 and FIG. 10 is a cross-sectional view of the lower edge part of the image forming unit 400 shown in FIG. 7.

Referring to FIGS. 9 and 10, the image forming unit 400 may be fixed by the mold frame 130 and the front chassis 110 at the edge parts. More specifically, the image forming unit 400 may be firmly fixed at the mold frame 130 by an adhesive 130a applied on the mold frame 130.

Also, as shown in FIG. 9, at the upper edge part of the image forming unit 400, the first polarizing film 410, the first transparent plate 430, the liquid crystal layer 450, the second transparent plate 440, and the second polarizing film 420 may be aligned along a first reference line RL1.

More specifically, the upper edges of the first polarizing film 410, the first transparent plate 430, the liquid crystal layer 450, the second transparent plate 440, and the second polarizing film 420 may be aligned, although there may be a few deviations.

Also, at the upper edge part of the image forming unit 400, the inside of the image forming unit 400 may be not shown to the user due to the first polarizing film 410 and the second polarizing film 420. In other words, no image may be displayed at the upper edge part of the image forming unit 400 so that the upper edge part of the image forming unit 400 may appear dark.

As not shown in the drawings, at the right and left edge parts of the image forming unit 400, likewise, the edges of the first polarizing film 410, the first transparent plate 430, the liquid crystal layer 450, the second transparent plate 440, and the second polarizing film 420 may be aligned. Also, at the right and left edge parts of the image forming unit 400, the inside of the image forming unit 400 may be not shown to the user due to the first polarizing film 410 and the second polarizing film 420.

Meanwhile, as shown in FIG. 10, at the lower edge part of the image forming unit 400 to which the cables 460 are connected, the first polarizing film 410, the first transparent plate 430, the liquid crystal layer 450, the second transparent plate 440, and the second polarizing film 420 may be not aligned.

More specifically, the first transparent plate 430 and the liquid crystal layer 450 may be aligned along a second reference line RL2, and the second transparent plate 440 may protrude by about a first length D1 from the second reference line RL2 in order to connect to the cables 460.

In other words, the lower edge 430b of the first transparent plate 430 and the lower edge 450b of the liquid crystal layer 450 may be aligned along the second reference line RL2, and the lower edge 440b of the second transparent plate 440 may protrude by about the first length D1 downward from the second reference line RL2.

As described above, the cables 460 may transmit image data from the power/control unit 160 (see FIG. 2) disposed on the back surface of the rear chassis 150 (see FIG. 2) to the second transparent plate 440. Also, the thin-film transistors 442 included in the second transparent plate 440 may be turned on or off according to the image data to transfer the image data to the transparent pixel electrodes 443. Also, an electric field may be formed or removed between the transparent pixel electrodes 443 and the transparent common electrode 433 according to the image data.

Since the thin-film transistors 442 and the transparent pixel electrodes 443 are mounted on the front surface of the second transparent plate 440, the second transparent plate 440 may protrude rather than the first transparent plate 430, the liquid crystal layer 450, and the second polarizing film 420 in order to electrically connect to the cables 460.

As such, if the second transparent plate 440 protrudes downward rather than the first transparent plate 430, the liquid crystal layer 450, and the second polarizing film 420, the edge part of the second transparent plate 440 and the cables 460 may be shown to a user.

Accordingly, in order to prevent the edge part of the second transparent plate 440 and the cables 460 from being shown to the user, the first polarizing film 410 may extend by about a second length D2 from the second reference line RL2. More specifically, the first polarizing film 410 may extend to or close to the front chassis 110. Also, the second length D2 which is the extended length of the first polarizing film 410 may be equal to or longer than the first length D1 which is the protruded length of the second transparent plate 440.

As such, if the first polarizing film 410 extends to or close to the front chassis 110, the lower edge 410b of the first polarizing film 410 may contact the front chassis 110, or may be disposed adjacent to the front chassis 110, as shown in FIG. 10.

As described above, in the display apparatus 100 including the front chassis 110 having no bezel, the second transparent plate 440 included in the image forming unit 400 may protrude downward to contact the cables 460, and the first polarizing film 410 may extend downward close to the front chassis 110 so that the protruded part of the second transparent plate 440 and the cables 460 are not shown to a user.

As such, since the front chassis 110 has no bezel, a user's sense of immersion in images displayed on the screen 102 (see FIG. 1) can be improved.

Also, since the first polarizing film 410 disposed at the front most part of the image forming unit 400 extends downward, the user cannot recognize the protruded part of the second transparent plate 440 and the cables 460.

In the current embodiment, the second transparent plate 440 including the thin-film transistors 442 and the transparent pixel electrodes 443 may be provided behind the liquid crystal layer 450. However, the second transparent plate 440 may be provided in front of the liquid crystal layer 450.

Also, in the current embodiment, the cables 460 may be connected to the second transparent plate 440 at the lower edge part of the image forming unit 400. However, the cables 460 may be connected to the second transparent plate 440 at the upper, right, or left edge part of the image forming unit 400.

Also, in the current embodiment, the second transparent plate 440 may protrude downward, and the first polarizing film 410 may also extend downward. However, the second transparent plate 440 may protrude upward, rightward, or leftward according to the location of the cables 460, and the first polarizing film 410 may also extend upward, rightward, or leftward according to the direction in which the second transparent plate 440 protrudes.

Figure 11:
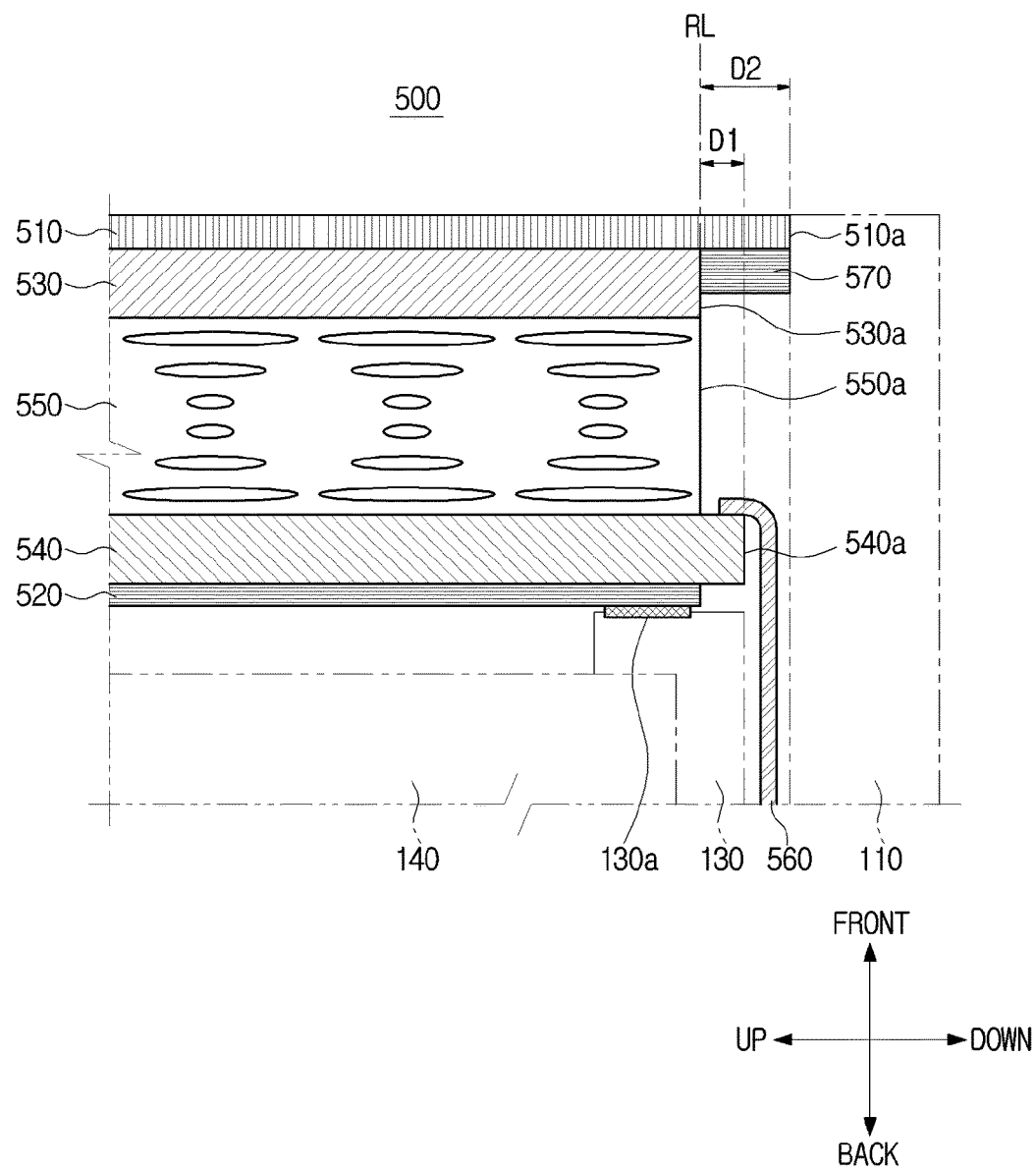
FIG. 11 is a cross-sectional view of the lower edge part of an image forming unit according to another embodiment of the present disclosure.

FIG. 11 is a cross-sectional view of the lower edge part of an image forming unit according to another embodiment of the present disclosure.

Referring to FIG. 11, an image forming unit 500 according to another embodiment of the present disclosure may include a first polarizing film 510, a second polarizing film 520, a first transparent plate 530, a second transparent plate 540, and a liquid crystal layer 550.

The first transparent plate 530 may be opposite to the second transparent plate 540, and the first polarizing film 510 and the second polarizing film 520 may be disposed on the outer surface of the first transparent plate 530 and the outer surface of the second transparent plate 540, respectively. Also, the liquid crystal layer 550 may be provided between the first transparent plate 530 and the second transparent plate 540.

At the lower edge part of the second transparent plate 540, a plurality of cables 560 may be provided. The cables 560 may transmit image data from the power/control unit 160 (see FIG. 2) to the second transparent plate 540, and may electrically connect to the second transparent plate 540 at the lower edge part of the second transparent plate 540.

Also, the second transparent plate 540 may protrude downward rather than the first transparent plate 530 and the liquid crystal layer 550 in order to connect to the cables 560. For example, the lower edge 530a of the first transparent plate 530 and the lower edge 550a of the liquid crystal layer 550 may be aligned along a reference line RL, and the lower edge 540a of the second transparent plate 540 may protrude downward by about a first length D1 from the reference line RL.

Also, in order to prevent the protruded part of the second transparent plate 540 and the cables 560 from being shown to the user, the first polarizing film 510 may extend by about a second length D2 from the reference line RL. The first polarizing film 510 may extend to or close to the front chassis 110. Also, the second length D2 may be equal to or longer than the first length D1 by which the second transparent plate 540 protrudes.

Also, in order to completely block light at the protruded part of the second transparent plate 540, a third polarizing film 570 may be disposed on the rear surface of the lower edge 510a of the first polarizing film 510. For example, as shown in FIG. 11, the third polarizing film 570 may be attached on the rear surface of the first polarizing film 510.

The width of the third polarizing film 570 may correspond to the second length D2 by which the first polarizing film 510 extends from the first transparent plate 530 and the liquid crystal layer 550. In other words, the third polarizing film 570 may be attached between the lower edge 510a of the first polarizing film 510 and the lower edge 530a of the first transparent plate 530.

As another example, the width of the third polarizing film 570 may correspond to the first length D1 by which the second transparent plate 540 protrudes from the first transparent plate 530 and the liquid crystal layer 550. In other words, the third polarizing film 570 may be attached between the lower edge 540a of the second transparent plate 540 and the lower edge 530a of the first transparent plate 530.

Also, the width of the third polarizing film 570 may correspond to an arbitrary length between the second length D2 and the first length D1.

The polarization direction of the third polarizing film 570 may be vertical to that of the first polarizing film 510. In other words, the polarization direction of the third polarizing film 570 may be the same as that of the second polarizing film 520.

If the third polarizing film 570 is provided at the extended part of the first polarizing film 510, light can be completely blocked at the extended part of the first polarizing film 510 due to the first polarizing film 510 and the third polarizing film 570.

Also, the protruded part of the second transparent plate 540 and the cables 560 may be not shown to the user due to the first polarizing film 510 and the third polarizing film 570.

As described above, in the display apparatus 100 including the front chassis 110 having no bezel, the second transparent plate 540 included in the image forming unit 500 may protrude downward to contact the cables 560, and the first polarizing film 510 may extend downward close to the front chassis 110 so that the protruded part of the second transparent plate 540 and the cables 560 are not shown to the user.

Also, at the extended part of the first polarizing film 510, the third polarizing film 570 having a polarization direction that is vertical to the polarization direction of the first polarizing film 510 may be provided. As a result, the protruded part of the second transparent plate 540 and the cables 560 may be not shown to the user.

In the current embodiment, the second transparent plate 540 is disposed behind the liquid crystal layer 550. However, the second transparent plate 540 may be disposed in front of the liquid crystal layer 550.

Also, in the current embodiment, the cables 560 may be connected to the second transparent plate 540 at the lower edge part of the image forming unit 500. However, the cables 550 may be connected to the second transparent plate 540 at the upper, right, or left edge part of the image forming unit 500.

Also, in the current embodiment, the second transparent plate 540 may protrude downward, and the first polarizing film 510 may also extend downward. However, the second transparent plate 540 may protrude upward, rightward, or leftward according to the location of the cables 560, and the first polarizing film 510 may extend upward, rightward, or leftward according to the direction in which the second transparent plate 540 protrudes.

Figure 12:
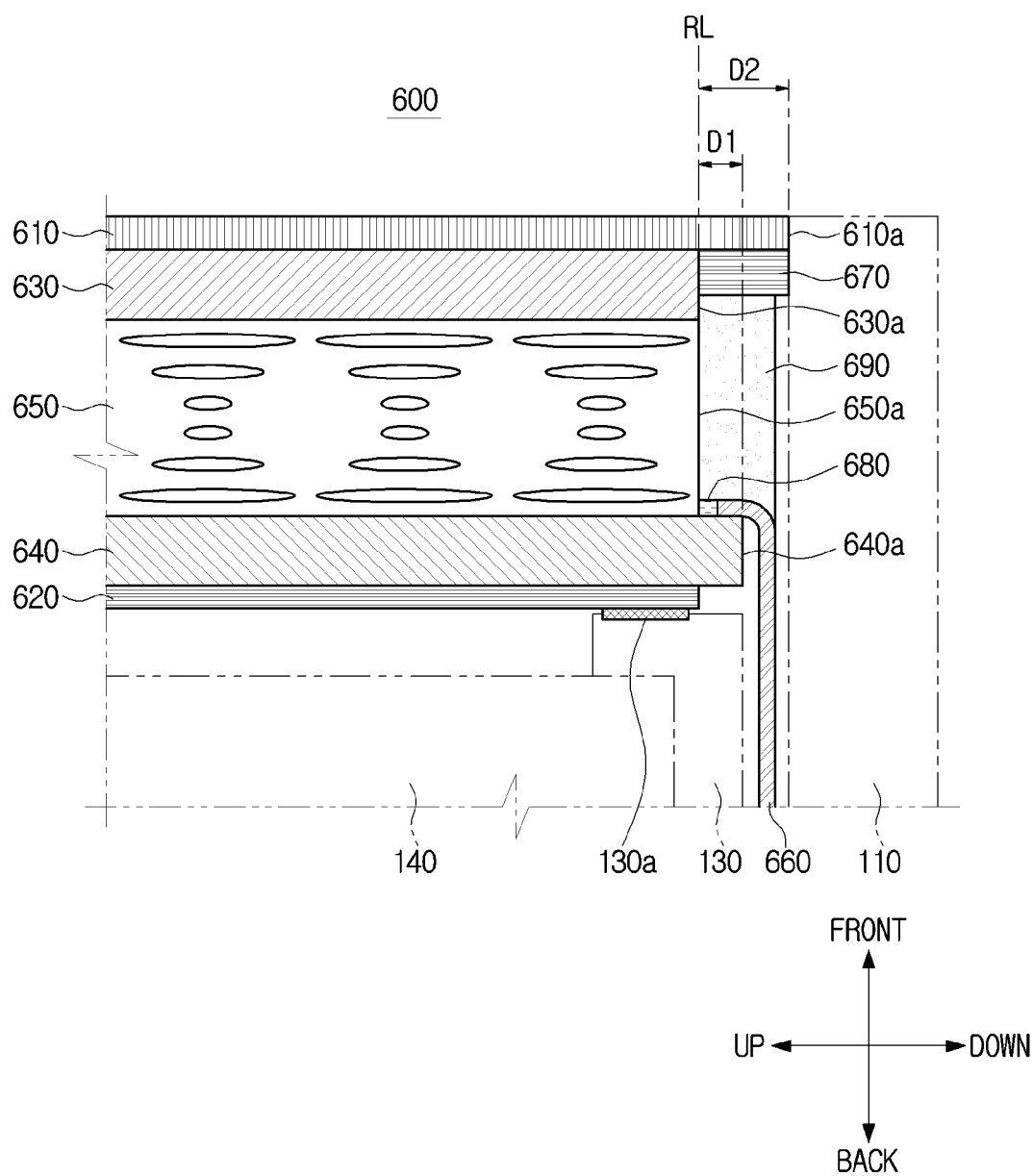
FIGS. 12 and 13 are cross-sectional views of the lower edge part of an image forming unit according to another embodiment of the present disclosure.
Figure 13:
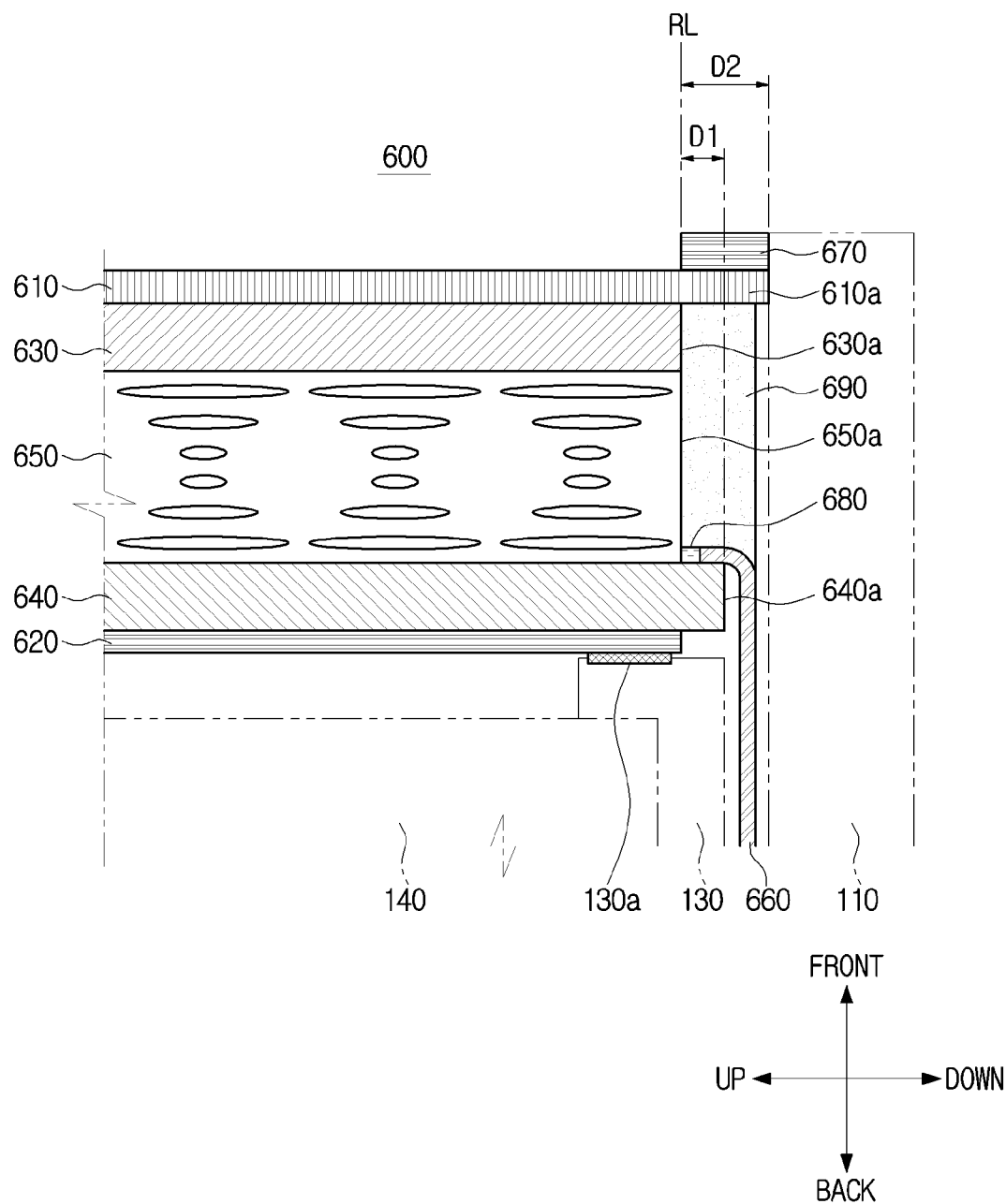

FIGS. 12 and 13 are cross-sectional views of the lower edge part of an image forming unit according to another embodiment of the present disclosure.

Referring to FIG. 12, an image forming unit 600 according to another embodiment of the present disclosure may include a first polarizing film 610, a second polarizing film 620, a first transparent plate 630, a second transparent plate 640, and a liquid crystal layer 650.

The first transparent plate 630 may be opposite to the second transparent plate 640, and the first polarizing film 610 and the second polarizing film 620 may be disposed on the outer surface of the first transparent plate 630 and the outer surface of the second transparent plate 640, respectively. Also, the liquid crystal layer 650 may be disposed between the first transparent plate 630 and the second transparent plate 640.

At the lower edge part of the second transparent plate 640, a plurality of cables 660 may be provided. The cables 660 may transmit image data from the power/control unit 160 (see FIG. 2) to the second transparent plate 640, and may electrically connect to the second transparent plate 640 at the lower edge part of the second transparent plate 640.

Also, the second transparent plate 640 may protrude downward rather than the first transparent plate 630 and the liquid crystal layer 650 in order to connect to the cables 660. For example, the lower edge 630a of the first transparent plate 630 and the lower edge 650a of the liquid crystal layer 650 may be aligned along a reference line RL, and the lower edge 640a of the second transparent plate 640 may protrude downward by about a first length D1 from the reference line RL.

Also, in order to prevent the protruded part of the second transparent plate 640 and the cables 660 from being shown to a user, the first polarizing film 610 may extend by about a second length D2 from the reference line RL. The first polarizing film 610 may extend to or close to the front chassis 110. Also, the second length D2 may be equal to or longer than the first length D1 by which the second transparent plate 640 protrudes.

Also, in order to completely block light at the protruded part of the second transparent plate 640, a third polarizing film 670 may be disposed on the rear surface of the extended part of the first polarizing film 610.

For example, the third polarizing film 670 may be attached on the rear surface of the first polarizing film 610, as shown in FIG. 12, or on the front surface of the first polarizing film 610, as shown in FIG. 13.

The width of the third polarizing film 670 may correspond to the second length D2 by which the first polarizing film 610 extends from the first transparent plate 630 and the liquid crystal layer 650, or may correspond to the first length D1 by which the second transparent plate 640 protrudes from the first transparent plate 630 and the liquid crystal layer 650. Also, the width of the third polarizing film 670 may correspond to an arbitrary length between the second length D2 and the first length D1.

The polarization direction of the third polarizing film 670 may be vertical to the polarization direction of the first polarizing film 610. Accordingly, due to the third polarizing film 670 having a polarization direction that is vertical to that of the first polarizing film 610, light may be blocked at the extended part of the first polarizing film 610.

Also, the cables 660 may contact a portion of the protruded part of the second transparent plate 640. Accordingly, a step and a color difference may be made between the protruded part of the second transparent plate 640 and the cables 660. Due to the step and color difference, the boundary line between the protruded part of the second transparent plate 640 and the cables 660 may be shown to a user.

In order to prevent the boundary line between the protruded part of the second transparent plate 640 and the cables 660 from being shown to the user, a dummy film 680 may be mounted at an area of the protruded part of the second transparent plate 640 on which the cables 660 are not mounted.

The dummy film 680 may be positioned between the lower edge 650a of the liquid crystal layer 650 and the cables 660.

The thickness of the dummy film 680 may be the same as that of the cables 680, and the color of the dummy film 680 may also be the same as or similar to that of the cables 660. As such, by providing the dummy film 680 having a thickness and color similar to those of the cables 660, the user may not recognize the boundary line between the dummy film 660 and the cables 660.

The first polarizing film 610 may be formed with a flexible material, and the extended part of the first polarizing film 610 may get bent when an external force is applied thereto.

In order to prevent the extended part of the first polarizing film 610 from getting bent when an external force is applied thereto, a support material 690 may be filled between the first polarizing film 610/the third polarizing film 670 and the dummy film 680/the cables 660.

The support material 690 may support the first polarizing film 610 and the third polarizing film 670. Also, when the third polarizing film 670 is attached on the rear surface of the first polarizing film 610, as shown in FIG. 12, the support material 690 may fix the third polarizing film 670 at the first polarizing film 610.

Also, the support material 690 may fix the dummy film 680 and the cables 660 on the second transparent plate 640 so that the dummy film 680 and the cables 660 do not deviate from the second transparent plate 640.

Also, in some cases, the support material 690 may block light at the extended part of the first polarizing film 610.

The support material 690 may be silicon, poron (microcellular urethane foam), an adhesive, or the like. However, the support material 690 may be any other material as long as it can support the first polarizing film 610 and the third polarizing film 670.

As described above, in the display apparatus 100 including the front chassis 110 having no bezel, the second transparent plate 640 included in the image forming unit 600 may protrude downward to contact the cables 660, and the first polarizing film 610 may extend downward close to the front chassis 110 so that the protruded part of the second transparent plate 640 and the cables 660 are not shown to a user.

Also, at the extended part of the first polarizing film 610, the third polarizing film 670 having a polarization direction that is vertical to the polarization direction of the first polarizing film 610 may be provided. As a result, the protruded part of the second transparent plate 640 and the cables 660 may be not shown to the user.

In the current embodiment, the second transparent plate 640 is disposed behind the liquid crystal layer 650. However, the second transparent plate 640 may be disposed in front of the liquid crystal layer 650.

Also, in the current embodiment, the cables 660 may be connected to the second transparent plate 640 at the lower edge part of the image forming unit 600. However, the cables 660 may be connected to the second transparent plate 640 at the upper, right, or left edge parts of the image forming unit 600.

Also, in the current embodiment, the second transparent plate 640 may protrude downward, and the first polarizing film 610 may also extend downward. However, the second transparent plate 640 may protrude upward, rightward, or leftward according to the location of the cables 660, and the first polarizing film 610 may also extend upward, rightward, or leftward according to a direction in which the second transparent plate 640 protrudes.

Figure 14:
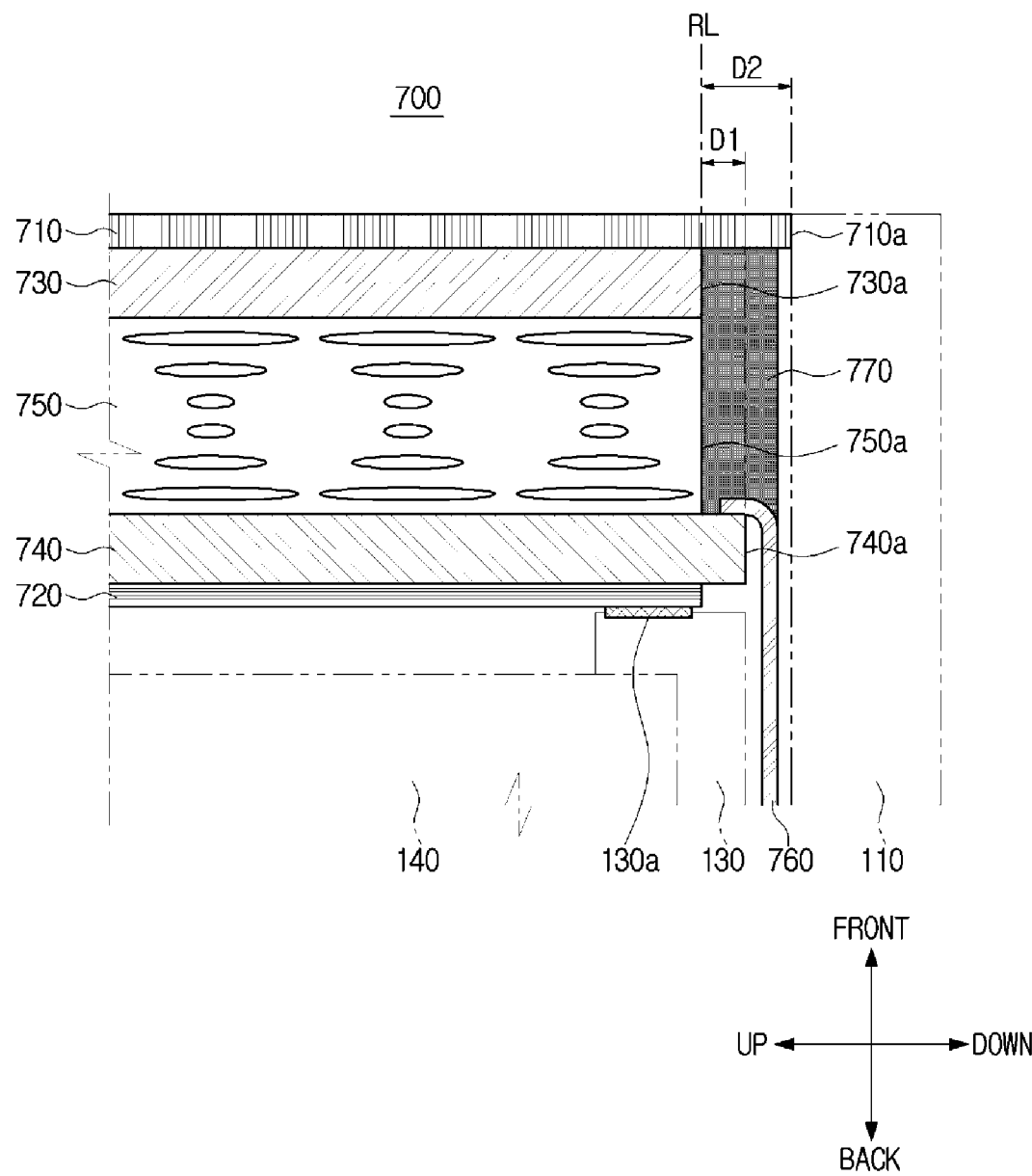
FIG. 14 is a cross-sectional view of the lower edge part of an image forming unit according to another embodiment of the present disclosure.

FIG. 14 is a cross-sectional view of the lower edge part of an image forming unit according to another embodiment of the present disclosure.

Referring to FIG. 14, an image forming unit 700 according to another embodiment of the present disclosure may include a first polarizing film 710, a second polarizing film 720, a first transparent plate 730, a second transparent plate 740, and a liquid crystal layer 750.

The first transparent plate 730 may be opposite to the second transparent plate 740, and the first polarizing film 710 and the second polarizing film 720 may be disposed on the outer surface of the first transparent plate 730 and the outer surface of the second transparent plate 740, respectively.

At the lower edge part of the second transparent plate 740, a plurality of cables 760 may be provided. The cables 760 may transmit image data from the power/control unit 160 (see FIG. 2) to the second transparent plate 740, and may electrically connect to the second transparent plate 740 at the lower edge part of the second transparent plate 740.

Also, the second transparent plate 740 may protrude downward rather than the first transparent plate 730 and the liquid crystal layer 750 in order to connect to the cables 760. For example, the lower edge 730a of the first transparent plate 730 and the lower edge 750a of the liquid crystal layer 750 may be aligned along a reference line RL, and the lower edge 740a of the second transparent plate 740 may protrude downward by about a first length D1 from the reference line RL.

Also, in order to prevent the protruded part of the second transparent plate 740 and the cables 760 from being shown to a user, the first polarizing film 710 may extend by about a second length D2 from the reference line RL. The first polarizing film 710 may extend to or close to the front chassis 110. Also, the second length D2 may be equal to or longer than the first length D1 by which the second transparent plate 740 protrudes.

Also, in order to completely block light at the protruded part of the second transparent plate 740, a shading material 770 may be filled between the first polarizing film 710 and the second transparent plate 740.

Since the shading material 770 filled between the first polarizing film 710 and the second transparent plate 740 can completely block light passed through the first polarizing film 710, the user may not recognize the protruded part of the second transparent plate 740 and the cables 760.

Also, the shading material 770 may prevent the extended part of the first polarizing film 710 from getting bent or the cables 760 from deviating from the second transparent plate 740 by an external force.

Since the first polarizing film 710 is formed with a flexible material, the extended part of the first polarizing film 710 may get bent when an external force is applied thereto. Also, since the cables 760 are pressed to be fixed at the second transparent plate 740, in some cases, the cables 760 may deviate from the second transparent plate 740.

Since the shading material 770 fills space between the first polarizing film 710 and the second transparent plate 740, the first polarizing film 710 can be supported by the shading material 770, and the cables 760 can be more firmly fixed on the second transparent plate 740 by the shading material 770.

A degree at which light is blocked by the first and second polarizing films 710 and 720 may be different from a degree at which light is blocked by the shading material 770. Accordingly, a boundary line between a part in which light is blocked by the first and second polarizing films 710 and 720 and a part in which light is blocked by the shading material 770 may be recognized by the user.

Accordingly, the shading material 770 may be a material capable of blocking light to a degree at which light is blocked by the first and second polarizing films 710 and 720.

For example, the shading material 770 may be a black ultraviolet curing agent. The black ultraviolet curing agent may show a color that is similar to that shown when light is blocked by the first and second polarizing films 710 and 720. Accordingly, if the black ultraviolet curing agent is used as the shading material 770, the boundary line between the part in which light is blocked by the first and second polarizing films 710 and 720 and the part in which light is blocked by the shading material 770 may be not recognized by the user.

The black ultraviolet curing agent may be filled between the first polarizing film 710 and the second transparent plate 740 by an injection and exposure process. For example, a black ultraviolet curing agent in a liquid state may be injected between the first polarizing film 710 and the second transparent plate 740 through a nozzle or the like, and then, ultraviolet light may be irradiated on an area to which the black ultraviolet curing agent in the liquid state is injected so as to harden the black ultraviolet curing agent.

However, the shading material 770 is not limited to the black ultraviolet curing agent, and various kinds of materials including a black poron and a black adhesive, capable of blocking light, may be used as the shading material 770.

As described above, in the display apparatus 100 including the front chassis 110 having no bezel, the second transparent plate 740 included in the image forming unit 700 may protrude downward to contact the cables 760, and the first polarizing film 710 may extend downward close to the front chassis 110 so that the protruded part of the second transparent plate 740 and the cables 760 are not shown to a user.

Also, the shading material 770 may be provided between the extended part of the first polarizing film 710 and the protruded part of the second transparent plate 740. As a result, the protruded part of the second transparent plate 740 and the cables 760 may be not recognized by the user.

In the current embodiment, the second transparent plate 740 may be disposed behind the liquid crystal layer 750. However, the second transparent plate 740 may be disposed in front of the liquid crystal layer 750.

Also, in the current embodiment, the cables 760 may be connected to the second transparent plate 740 at the lower edge part of the image forming unit 700, however, the cables 760 may be connected to the second transparent plate 740 at the upper, right, or left edge part of the image forming unit 700.

Also, in the current embodiment, the second transparent plate 740 may protrude downward, and the first polarizing film 710 may also extend downward. However, the second transparent plate 740 may protrude upward, rightward, or leftward according to the position of the cables 760, and the first polarizing film 710 may also extend upward, rightward, or leftward according to the direction in which the second transparent plate 740 protrudes.

Figure 15:
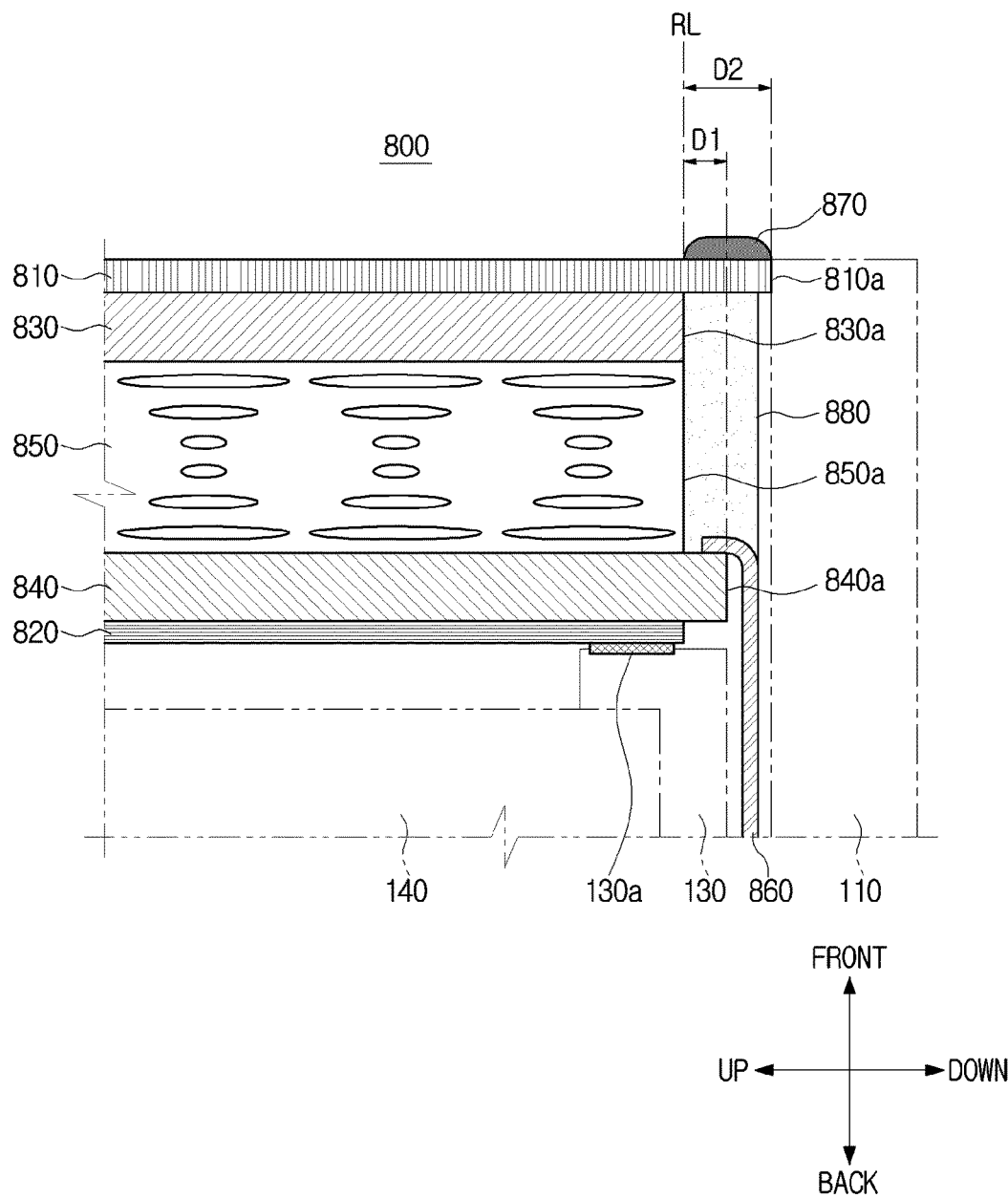
FIGS. 15 and 16 are cross-sectional views of the lower edge part of an image forming unit according to another embodiment of the present disclosure.
Figure 16:
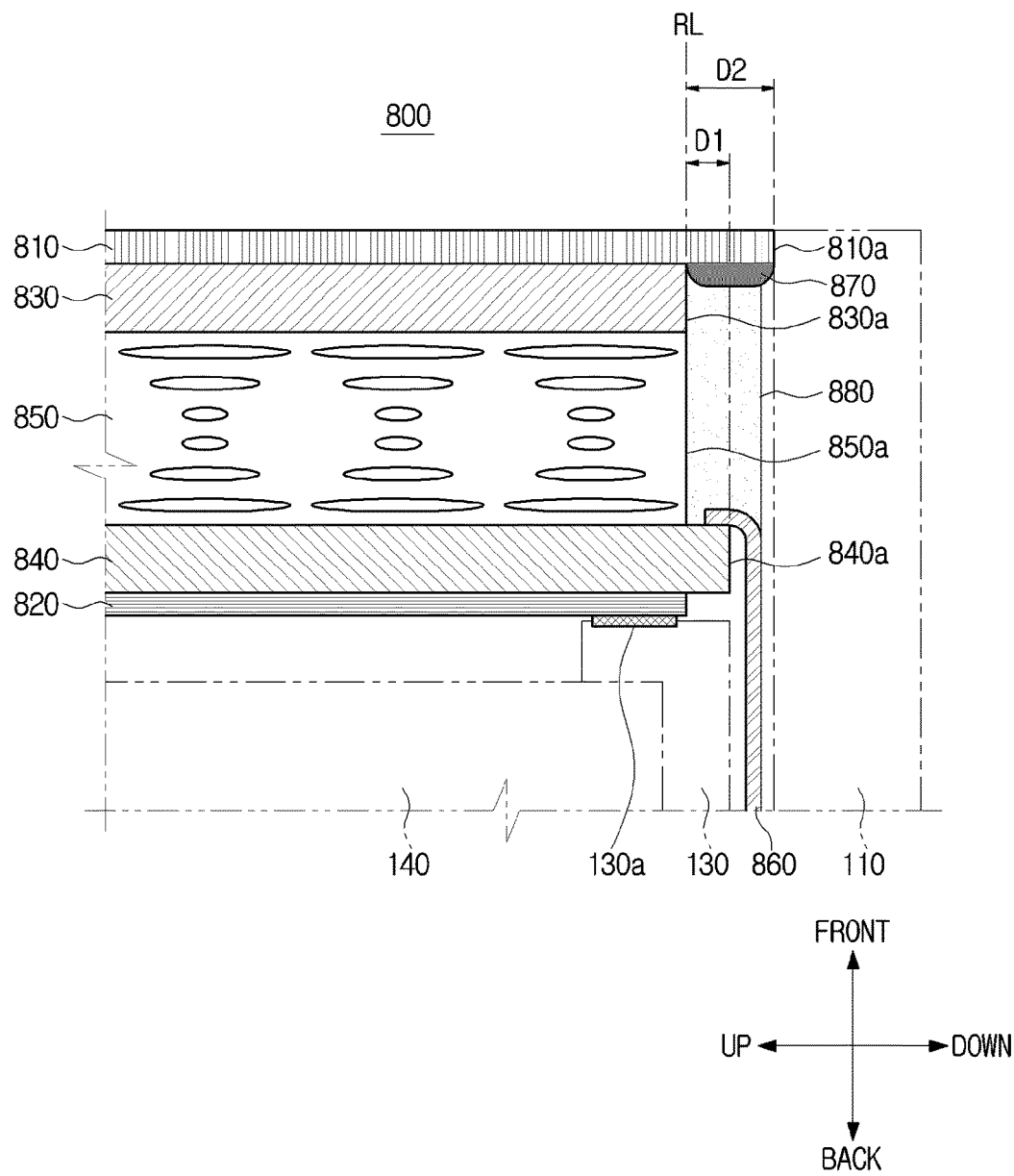

FIGS. 15 and 16 are cross-sectional views of the lower edge part of an image forming unit according to another embodiment of the present disclosure.

Referring to FIGS. 15 and 16, an image forming unit 800 according to another embodiment of the present disclosure may include a first polarizing film 810, a second polarizing film 820, a first transparent plate 830, a second transparent plate 840, and a liquid crystal layer 850.

The first transparent plate 830 may be opposite to the second transparent plate 840, and the first polarizing film 810 and the second polarizing film 820 may be disposed on the outer surface of the first transparent plate 830 and the outer surface of the second transparent plate 840, respectively. Also, the liquid crystal layer 850 may be disposed between the first transparent plate 830 and the second transparent plate 840.

A plurality of cables 860 may be provided at the lower edge part of the second transparent plate 840. The cables 860 may transfer image data output from the power/control unit 160 (see FIG. 2) to the second transparent plate 840, and be electrically connected to the second transparent plate 840 at the lower edge part of the second transparent plate 840.

Also, the second transparent plate 840 may protrude downward rather than the first transparent plate 830 and the liquid crystal layer 850, in order to connect to the cables 860. For example, the lower edge 830a of the first transparent plate 830 and the lower edge 850a of the liquid crystal layer 850 may be aligned along a reference line RL, and the lower edge 840a of the second transparent plate 840 may protrude by about a first length D1 downward from the reference line RL.

Also, in order to prevent the protruded part of the second transparent plate 840 and the cables 860 from being shown to a user, the first polarizing film 810 may extend by about a second length D2 from the reference line RL. The first polarizing film 810 may extend to or close to the front chassis 110. Also, the second length D2 may be equal to or longer than the first length D1 by which the second transparent plate 840 protrudes.

Also, in order to completely block light at the protruded part of the second transparent plate 840, a shading material 870 may be applied on the extended part of the first polarizing film 810. For example, the shading material 870 may be applied on the front surface of the extended part of the first polarizing film 810, as shown in FIG. 15, or on the rear surface of the extended part of the first polarizing film 810, as shown in FIG. 16.

Since the shading material 870 can completely block light passed through the first polarizing film 810, the user can recognize neither the protruded part of the second transparent plate 840 nor the cables 860.

A degree at which light is blocked by the first and second polarizing films 810 and 820 may be different from a degree at which light is blocked by the shading material 870. Accordingly, a boundary line between a part in which light is blocked by the first and second polarizing films 810 and 820 and a part in which light is blocked by the shading material 870 may be recognized by the user.

Accordingly, the shading material 870 may be a material capable of blocking light to a degree at which light is blocked by the first and second polarizing films 810 and 820.

For example, the shading material 870 may be a black ultraviolet curing agent. The black ultraviolet curing agent may show a color that is similar to that shown when light is blocked by the first polarizing film 810 and the second polarizing film 820. Accordingly, if the black ultraviolet curing agent is used as the shading material 870, the boundary line between the part in which light is blocked by the first and second polarizing films 810 and 820 and the part in which light is blocked by the shading material 870 may be not recognized by the user.

The black ultraviolet curing agent may be applied on the front or rear surface of the first polarizing film 810 by coating and exposure processes. For example, a print process or a spray process may be performed to coat a black ultraviolet curing agent in a liquid state on the front or rear surface of the first polarizing film 510, and then, ultraviolet light may be irradiated on an area on which the black ultraviolet curing agent in the liquid state is coated so as to harden the black ultraviolet curing agent.

The first polarizing film 810 may be formed with a flexible material, and the extended part of the first polarizing film 810 may get bent when an external force is applied thereto. Also, since the cables 860 are pressed to be fixed at the second transparent plate 840, the cables 860 may deviate from the second transparent plate 840.

In order to prevent the extended part of the first polarizing film 810 from getting bent or the cables 860 from deviating from the second transparent plate 840 by an external force, a support material 880 may be filled between the first polarizing film 810 and the second transparent plate 840.

Since the support material 880 fills space between the first polarizing film 810 and the second transparent plate 840, the first polarizing film 810 can be supported by the support material 880, and the cables 860 can be more firmly fixed on the second transparent plate 840 by the support material 880.

Also, the support material 880 may block light in the extended part of the first polarizing film 810.

The support material 880 may be silicon, poron, an adhesive, or the like. However, the support material 880 may be any other material as long as it can support the first polarizing film 810.

As described above, in the display apparatus 100 including the front chassis 110 having no bezel, the second transparent plate 840 included in the image forming unit 800 may protrude downward to contact the cables 860, and the first polarizing film 810 may extend downward close to the front chassis 110 so that the protruded part of the second transparent plate 840 and the cables 860 are not shown to a user.

Also, a shading material 870 may be applied on the front or rear surface of the extended part of the first polarizing film 810. As a result, the protruded part of the second transparent plate 840 and the cables 860 may be not recognized by the user.

In the current embodiment, the second transparent plate 840 is provided behind the liquid crystal layer 850. However, the second transparent plate 840 may be provided in front of the liquid crystal layer 850.

Also, in the current embodiment, the cables 860 may be connected to the second transparent plate 840 at the lower edge part of the image forming unit 800. However, the cables 860 may be connected to the second transparent plate 840 at the upper, right, or left edge part of the image forming unit 800.

Also, in the current embodiment, the second transparent plate 840 may protrude downward, and the first polarizing film 810 may also extend downward. However, the second transparent plate 840 may protrude upward, rightward, or leftward according to the location of the cables 860, and the first polarizing film 810 may also extend upward, rightward, or leftward according to the direction in which the second transparent plate 840 protrudes.

Figure 17:
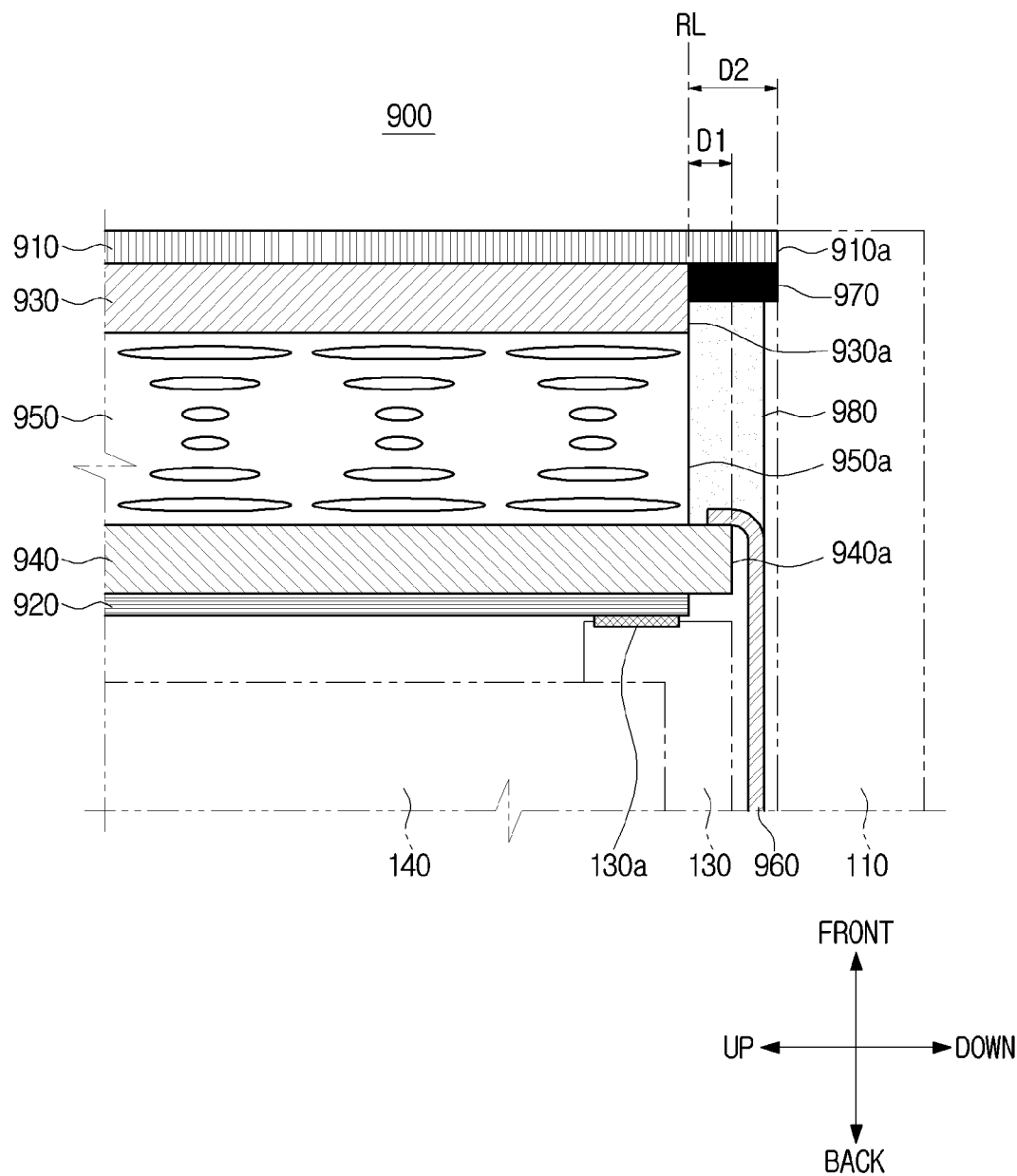
FIGS. 17 and 18 are cross-sectional views of the lower edge part of an image forming unit according to another embodiment of the present disclosure.
Figure 18:
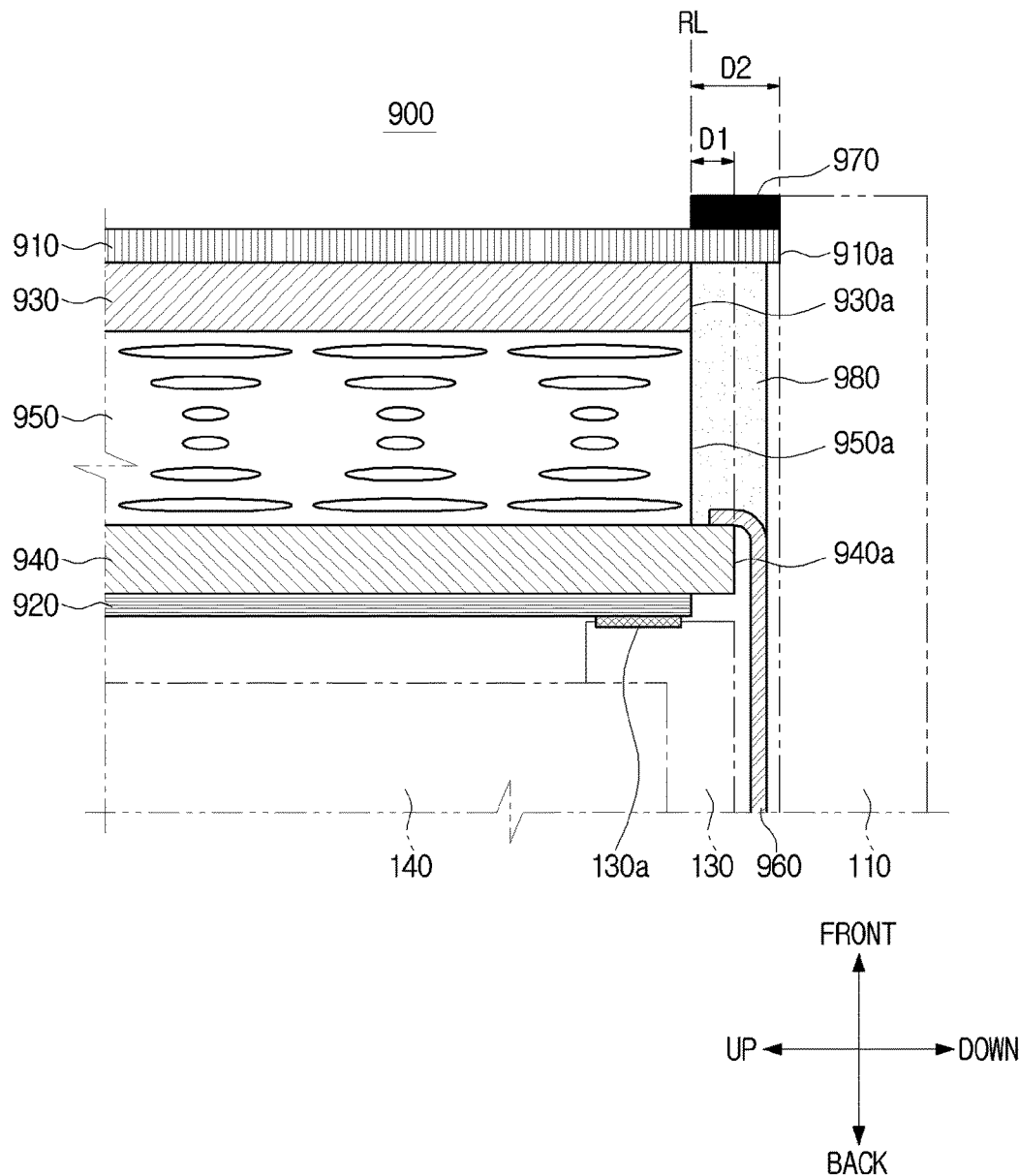

FIGS. 17 and 18 are cross-sectional views of the lower edge part of an image forming unit according to another embodiment of the present disclosure.

Referring to FIGS. 17 and 18, an image forming unit 900 according to another embodiment of the present disclosure may include a first polarizing film 910, a second polarizing film 920, a first transparent plate 930, a second transparent plate 940, and a liquid crystal layer 950.

The first transparent plate 930 may be opposite to the second transparent plate 940, and the first polarizing film 910 and the second polarizing film 920 may be disposed on the outer surface of the first transparent plate 930 and the outer surface of the second transparent plate 940, respectively. Also, the liquid crystal layer 950 may be provided between the first transparent plate 930 and the second transparent plate 940.

At the lower edge part of the second transparent plate 940, a plurality of cables 960 may be provided. The cables 960 may transmit image data from the power/control unit 160 (see FIG. 2) to the second transparent plate 940, and may electrically connect to the second transparent plate 940 at the lower edge part of the second transparent plate 940.

Also, the second transparent plate 940 may protrude downward rather than the first transparent plate 930 and the liquid crystal layer 950 in order to connect to the cables 560. For example, the lower edge 930a of the first transparent plate 930 and the lower edge 950a of the liquid crystal layer 950 may be aligned along a reference line RL, and the lower edge 940a of the second transparent plate 940 may protrude downward by about a first length D1 from the reference line RL.

Also, in order to prevent the protruded part of the second transparent plate 540 and the cables 960 from being shown to the user, the first polarizing film 910 may extend by about a second length D2 from the reference line RL. The first polarizing film 910 may extend to or close to the front chassis 110. Also, the second length D2 may be equal to or longer than the first length D1 by which the second transparent plate 940 protrudes.

Also, in order to completely block light at the protruded part of the second transparent plate 940, a shading film 970 may be disposed on the extended part of the first polarizing film 910. For example, the shading film 970 may be attached on the front surface of the extended part of the first polarizing film 910, as shown in FIG. 17, or on the rear surface of the extended part of the first polarizing film 910, as shown in FIG. 18.

Since the shading film 970 can completely block light passed through the first polarizing film 910, the user may not recognize the protruded part of the second transparent plate 940 and the cables 960.

A degree at which light is blocked by the first and second polarizing films 910 and 920 may be different from a degree at which light is blocked by the shading film 970. Accordingly, a boundary line between a part in which light is blocked by the first and second polarizing films 910 and 920 and a part in which light is blocked by the shading film 970 may be recognized by a user.

Accordingly, the shading film 970 may be a material capable of blocking light to a degree at which light is blocked by the first and second polarizing films 910 and 920.

The shading film 970 may be a black polymer film. For example, the shading film 970 may be a black polyethylene terephthalate (PET) film, a black polyester film, a black polycarbonate (PC) film, a black polyethylene (PE) film, or the like.

Such a black polymer film may show a color that is similar to that shown when light is blocked by the first and second polarizing films 910 and 920. Accordingly, if a block polymer film is used as the shading film 970, the boundary line between the part in which light is blocked by the first and second polarizing films 910 and 920 and the part in which light is blocked by the shading film 970 may be not recognized by the user.

The first polarizing film 910 and the shading film 970 may be formed with a flexible material. Accordingly, the extended part of the first polarizing film 710 and the shading film 970 may get bent when an external force is applied thereto. Also, since the cables 960 are pressed to be fixed at the second transparent plate 940, the cables 960 may deviate from the second transparent plate 940.

In order to prevent the extended part of the first polarizing film 910 from getting bent or the cables 960 from deviating from the second transparent plate 940 by an external force, a support material 980 may be filled between the first polarizing film 910 and the second transparent plate 940.

The support material 980 may block light at the extended part of the first polarizing film 910.

The support material 980 may be silicon, poron, an adhesive, or the like. However, the support material 980 may be any other material as long as it can support the first polarizing film 910.

As described above, in the display apparatus 100 including the front chassis 110 having no bezel, the second transparent plate 940 included in the image forming unit 900 may protrude downward to contact the cables 960, and the first polarizing film 910 may extend downward close to the front chassis 110 so that the protruded part of the second transparent plate 940 and the cables 960 are not shown to a user.

Also, a shading film 970 may be applied on the front or rear surface of the extended part of the first polarizing film 910. As a result, the protruded part of the second transparent plate 940 and the cables 960 may be not recognized by the user.

In the current embodiment, the second transparent plate 940 is provided behind the liquid crystal layer 850. However, the second transparent plate 940 may be provided in front of the liquid crystal layer 950.

Also, in the current embodiment, the cables 960 may be connected to the second transparent plate 940 at the lower edge part of the image forming unit 900. However, the cables 960 may be connected to the second transparent plate 940 at the upper, right, or left edge part of the image forming unit 900.

Also, in the current embodiment, the second transparent plat 940 may protrude downward, and the first polarizing film 910 may also extend downward. However, the second transparent plate 940 may protrude upward, rightward, or leftward according to the location of the cables 960, and the first polarizing film 910 may also extend upward, rightward, or leftward according to the direction in which the second transparent plate 940 protrudes.

Figure 19:
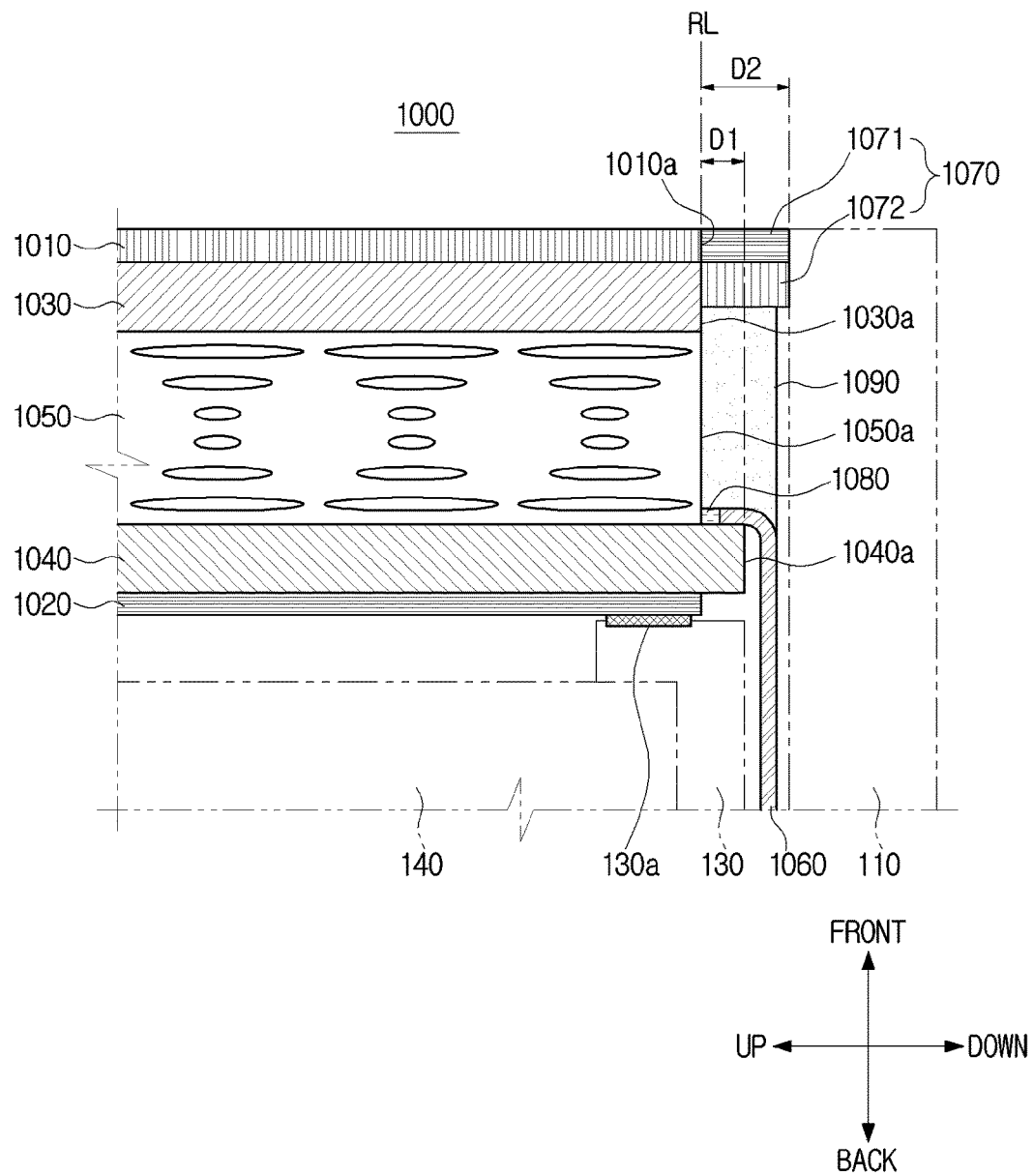
FIGS. 19 and 20 are cross-sectional views of the lower edge part of an image forming unit according to another embodiment of the present disclosure.
Figure 20:
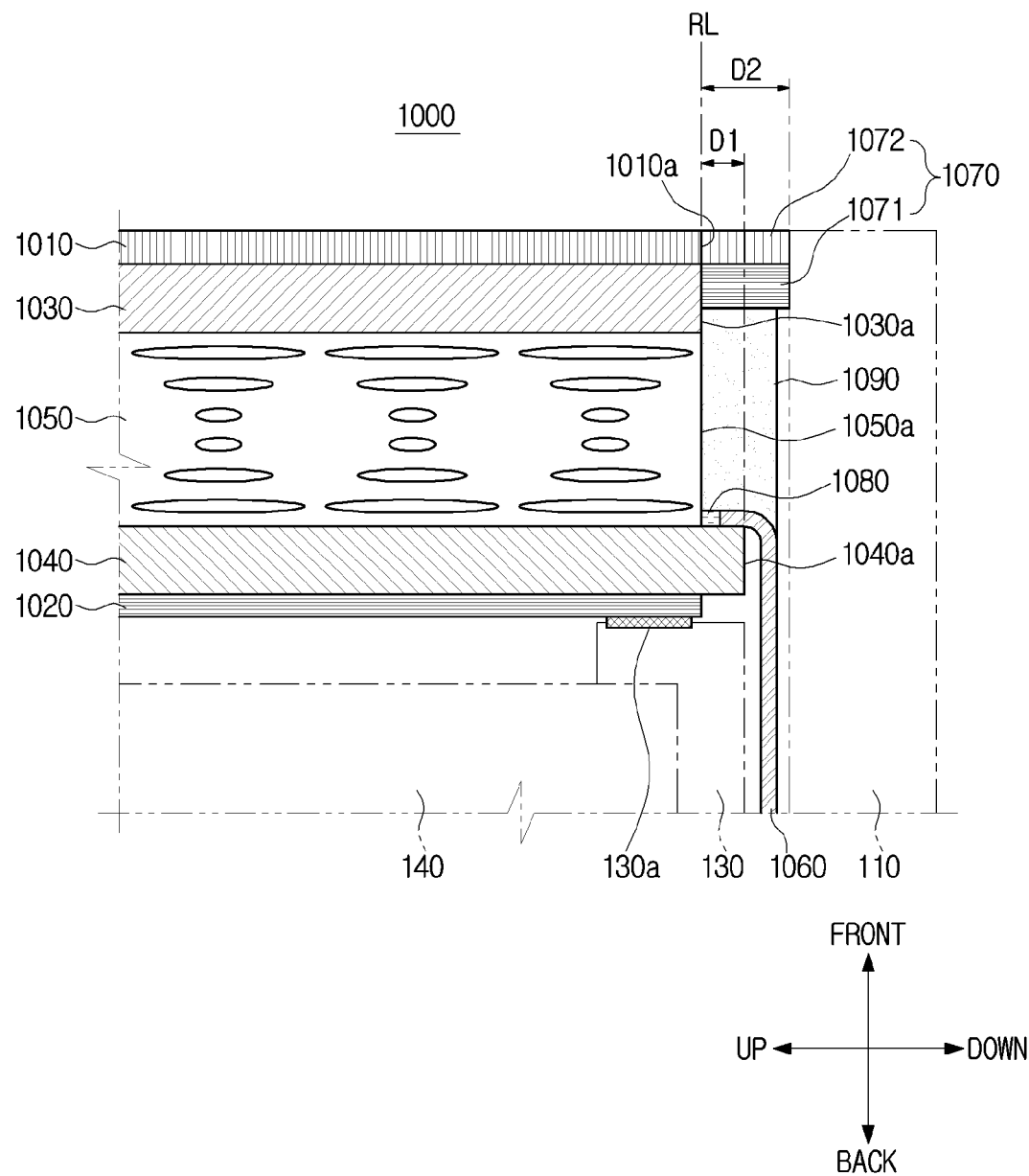

FIGS. 19 and 20 are cross-sectional views of the lower edge part of an image forming unit according to another embodiment of the present disclosure.

Referring to FIGS. 19 and 20, an image forming unit 1000 according to another embodiment of the present disclosure may include a first polarizing film 1010, a second polarizing film 1020, a first transparent plate 1030, a second transparent plate 1040, and a liquid crystal layer 1050.

The first transparent plate 1030 may be opposite to the second transparent plate 1040, and the first polarizing film 1010 and the second polarizing film 1020 may be disposed on the outer surface of the first transparent plate 1030 and the outer surface of the second transparent plate 1040, respectively. Also, the liquid crystal layer 1050 may be provided between the first transparent plate 1030 and the second transparent plate 1040.

At the lower edge part of the second transparent plate 1040, a plurality of cables 1060 may be provided. The cables 1060 may transmit image data from the power/control unit 160 (see FIG. 2) to the second transparent plate 1040, and may electrically connect to the second transparent plate 1040 at the lower edge part of the second transparent plate 1040.

Also, the second transparent plate 1040 may protrude downward rather than the first polarizing film 1010, the first transparent plate 1030, and the liquid crystal layer 1050 in order to connect to the cables 1060. For example, the lower edge 1010a of the first polarizing film 1010, the lower edge 1030a of the first transparent plate 1030, and the lower edge 1050a of the liquid crystal layer 1050 may be aligned along a reference line RL, and the lower edge 1040a of the second transparent plate 1040 may protrude downward by about a first length D1 from the reference line RL.

Also, in order to prevent the protruded part of the second transparent plate 1040 and the cables 1060 from being shown to a user, a shading member 1070 may be provided at the lower part of the first polarizing film 1010.

More specifically, the shading member 1070 may be provided between the lower edge 1010a of the first polarizing film 1010 and the front chassis 110. The width of the shading member 1070 may be a first length D1 that is the width of the protruded part of the second transparent plate 1040, or may be a second length D2 that is longer than the width of the protruded part of the second transparent plate 1040.

The shading member 1070 may include a third polarizing film 1071 and a fourth polarizing film 1072. The third polarizing film 1071 may face the fourth polarizing film 1072. For example, as shown in FIG. 19, the fourth polarizing film 1072 may be located in front of the third polarizing film 1071 such that the rear surface of the fourth polarizing film 1072 contacts the front surface of the third polarizing film 1071. Alternatively, as shown in FIG. 20, the third polarizing film 1071 may be located in front of the fourth polarizing film 1072 such that the rear surface of the third polarizing film 1071 contacts the front surface of the fourth polarizing film 1072.

Also, the polarization direction of the third polarizing film 1071 may be vertical to the polarization direction of the fourth polarizing film 1072. For example, the polarization direction of the third polarizing film 1071 may be the same as that of the second polarizing film 1020, and the polarization direction of the fourth polarizing film 1072 may be the same as that of the first polarizing film 1010. Accordingly, light may be blocked by the third polarizing film 1071 and the fourth polarizing film 1072.

Also, the cables 1060 may contact a part of the protruded part of the second transparent plate 1040. Accordingly, a step and a color difference may be made between the protruded part of the second transparent plate 1040 and the cables 1060. Due to the step and color difference, the boundary line between the protruded part of the second transparent plate 1040 and the cables 1060 may be shown to a user.

In order to prevent the boundary line between the protruded part of the second transparent plate 1040 and the cables 1060 from being shown to the user, a dummy film 1080 may be mounted at an area of the protruded part of the second transparent plate 1040 on which the cables 1060 are not mounted.

The dummy film 1080 may be positioned between the lower edge 1050*a* of the liquid crystal layer 1050 and the cables 1060.

The thickness of the dummy film 1080 may be the same as that of the cables 1080, and the color of the dummy film 1080 may also be the same as or similar to that of the cables 1060. As such, by providing the dummy film 1080 having a thickness and color similar to those of the cables 1060, the user may not recognize the boundary line between the dummy film 1060 and the cables 1060.

In order to support the shading member 1070, a support material 1090 may be filled between the shading member 1070 and the dummy film 1080/cables 1060.

The support material 1090 may support the shading member 1070, and may fix the dummy film 1080 and the cables 1060 on the second transparent plate 1040 so that the dummy film 1080 and the cables 1060 do not deviate from the second transparent plate 1040.

Also, in some cases, the support material 1090 may block light at an area in which the shading member 1070 is provided.

The support material 1090 may be silicon, poron, an adhesive, or the like. However, the support material 1090 may be any other material as long as it can support the shading member 1070.

As described above, in the display apparatus 100 including the front chassis 110 having no bezel, the second transparent plate 1040 included in the image forming unit 1000 may protrude downward to contact the cables 1060, and the shading member 1070 may be provided to correspond to the protruded part of the second transparent plate 1040. The shading member 1070 may include the third polarizing film 1071 and the fourth polarizing film 1072, wherein the polarization direction of the third polarizing film 1071 is vertical to the polarization direction of the fourth polarizing film 1072. As a result, due to the shading member 1070, the protruded part of the second transparent plate 1040 and the cables 1060 may be not recognized by a user.

In the current embodiment, the second transparent plate 1040 may be provided behind the liquid crystal layer 1050, however, the second transparent plate 1040 may be provided in front of the liquid crystal layer 1050.

Also, in the current embodiment, the cables 1060 may be connected to the second transparent plate 1040 at the lower edge part of the image forming unit 1000, however, the cables 1060 may be connected to the second transparent plate 440 at the upper, right, or left edge part of the image forming unit 1000.

Also, in the current embodiment, the second transparent plate 1040 may protrude downward, and the first polarizing film 1010 may also extend downward. However, the second transparent plate 1040 may protrude upward, rightward, or leftward according to the location of the cables 1060, and the first polarizing film 1010 may also extend upward, rightward, or leftward according to the direction in which the second transparent plate 1040 protrudes.

Figure 21:
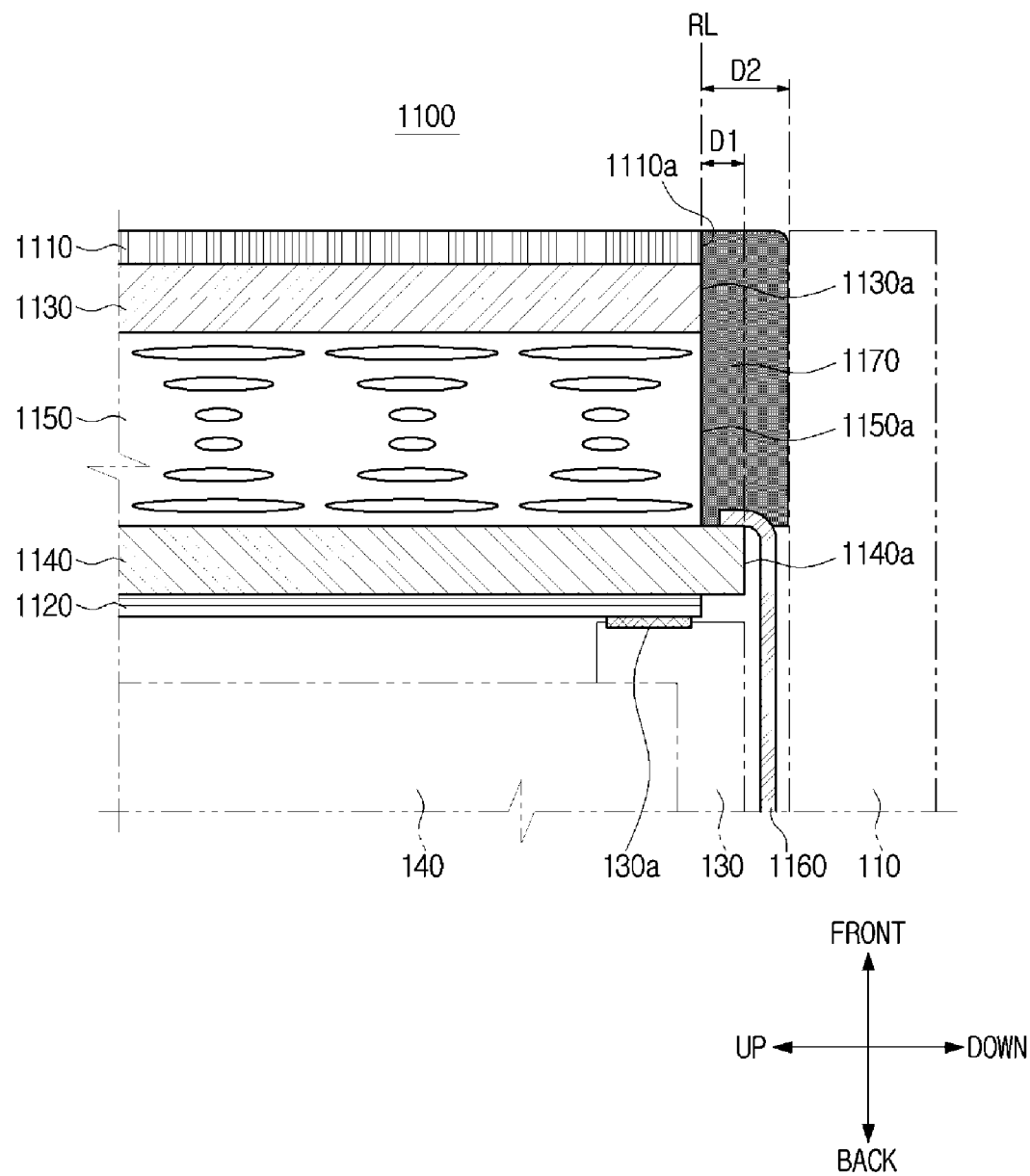
FIG. 21 is a cross-sectional view of the lower edge part of an image forming unit according to another embodiment of the present disclosure.

FIG. 21 is a cross-sectional view of the lower edge part of an image forming unit according to another embodiment of the present disclosure.

Referring to FIG. 21, an image forming unit 1100 may include a first polarizing film 1110, a second polarizing film 1120, a first transparent plate 1130, a second transparent plate 1140, and a liquid crystal layer 1150.

The first transparent plate 1130 may be opposite to the second transparent plate 1140, and the first polarizing film 1110 and the second polarizing film 1120 may be disposed on the outer surface of the first transparent plate 1130 and the outer surface of the second transparent plate 1140, respectively. Also, the liquid crystal layer 1150 may be provided between the first transparent plate 1130 and the second transparent plate 1140.

At the lower edge part of the second transparent plate 1140, a plurality of cables 1160 may be provided. The cables 1160 may transmit image data from the power/control unit 160 (see FIG. 2) to the second transparent plate 1140, and may electrically connect to the second transparent plate 1140 at the lower edge part of the second transparent plate 1140.

Also, the second transparent plate 1140 may protrude downward rather than the first polarizing film 1110, the first transparent plate 1130, and the liquid crystal layer 1150 in order to connect to the cables 1160. For example, the lower edge 1110*a* of the first polarizing film 1110, the lower edge 1130*a* of the first transparent plate 1130, and the lower edge 1150*a* of the liquid crystal layer 1150 may be aligned along a reference line RL, and the lower edge 1140*a* of the second transparent plate 1140 may protrude downward by about a first length D1 from the reference line RL.

Also, in order to prevent the protruded part of the second transparent plate 1140 and the cables 1160 from being shown to a user, a shading material 1170 may be filled between the image forming unit 1100 and the front chassis 110.

Since the shading material 1170 blocks light between the image forming unit 1100 and the front chassis 110, the user may not recognize the protruded part of the second transparent plate 1140 and the cables 1160.

Also, since the shading material 1170 fills space between the image forming unit 1100 and the front chassis 110, the image forming unit 1100 may be firmly fixed at the front chassis 110.

A degree at which light is blocked by the first and second polarizing films 1110 and 1120 may be different from a degree at which light is blocked by the shading material 1170. Accordingly, a boundary line between a part in which light is blocked by the first and second polarizing films 1110 and 1120 and a part in which light is blocked by the shading material 1170 may be recognized by a user.

Accordingly, the shading material 1170 may be a material capable of blocking light to a degree at which light is blocked by the first and second polarizing films 1110 and 1120.

For example, the shading material 1170 may be a black ultraviolet curing agent. The black ultraviolet curing agent may show a color that is similar to that shown when light is blocked by the first and second polarizing films 1110 and 1120. Accordingly, if the black ultraviolet curing agent is used as the shading material 1170, the boundary line between the part in which light is blocked by the first and second polarizing films 1110 and 1120 and the part in which light is blocked by the shading material 1170 may be not recognized by the user.

The black ultraviolet curing agent may be filled between the image forming unit 1100 and the front chassis 110 by an injection and exposure process. For example, a black ultraviolet curing agent in a liquid state may be injected between the image forming unit 1100 and the front chassis 110 through a nozzle or the like, and then, ultraviolet light may be irradiated on an area to which the black ultraviolet curing agent in the liquid state is injected so as to harden the black ultraviolet curing agent.

However, the shading material 1170 is not limited to the black ultraviolet curing agent, and various kinds of materials including a black poron and a black adhesive, capable of blocking light, may be used as the shading material 1170.

As described above, in the display apparatus 100 including the front chassis 110 having no bezel, the second transparent plate 1140 included in the image forming unit 1100 may protrude downward to contact the cables 1160, and the shading material 1170 may be provided between the image forming unit 1100 and the front chassis 110. As a result, the protruded part of the second transparent plate 1140 and the cables 1160 may be not shown to a user.

In the current embodiment, the second transparent plate 1140 may be provided behind the liquid crystal layer 1150. However, the second transparent plate 1140 may be provided in front of the liquid crystal layer 1150.

Also, in the current embodiment, the cables 1160 may be connected to the second transparent plate 1140 at the lower edge part of the image forming unit 1100. However, the cables 1160 may be connected to the second transparent plate 1140 at the upper, right, or left edge part of the image forming unit 1100.

Also, in the current embodiment, the second transparent plate 1140 may protrude downward, and the first polarizing film 1110 may also extend downward. However, the second transparent plate 1140 may protrude upward, rightward, or leftward according to the location of the cables 1160, and the first polarizing film 1110 may also extend upward, rightward, or leftward according to the direction in which the second transparent plate 1140 protrudes.

Figure 22:
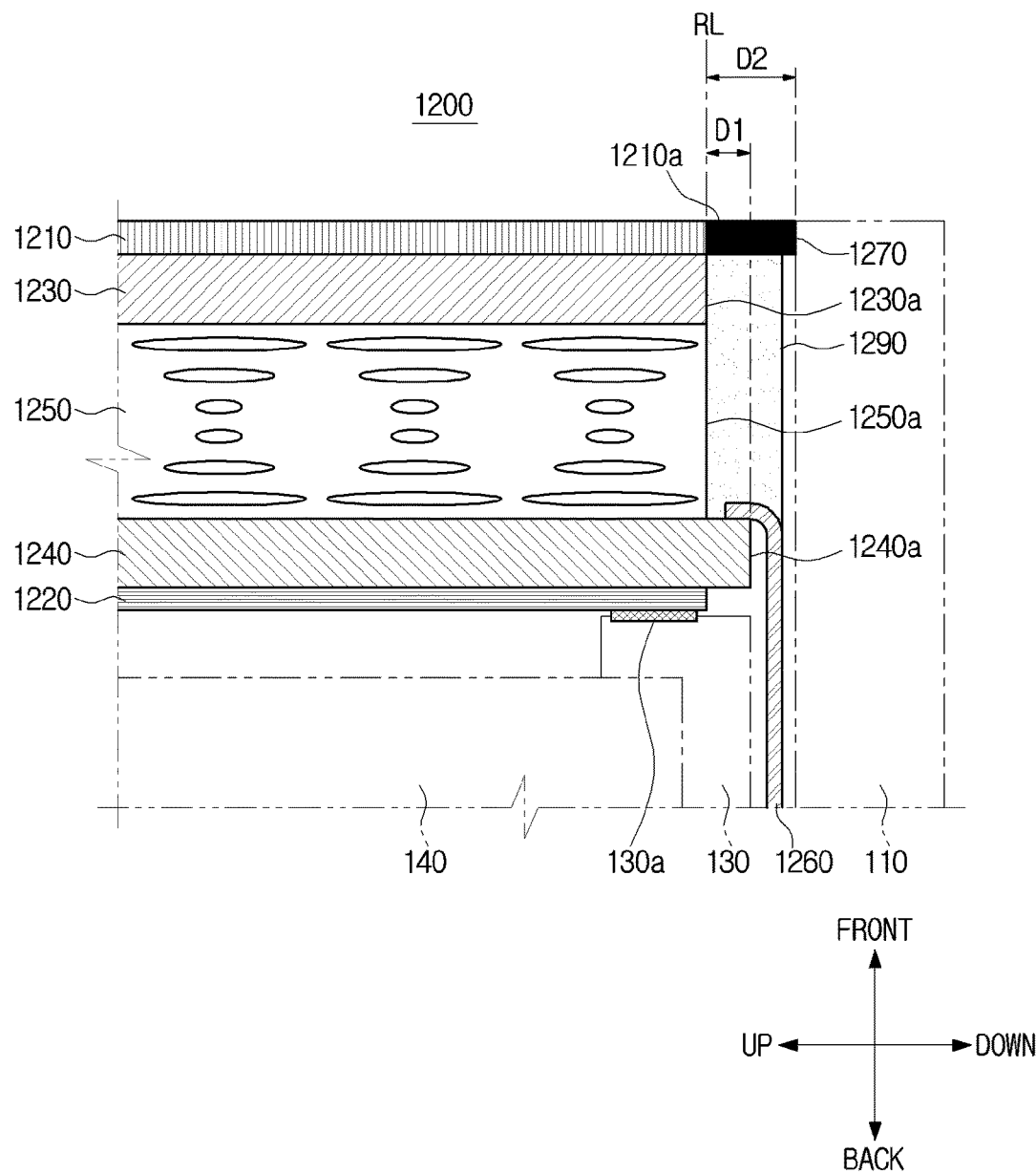
FIG. 22 is a cross-sectional view of the lower edge part of an image forming unit according to another embodiment of the present disclosure.

FIG. 22 is a cross-sectional view of the lower edge part of an image forming unit according to another embodiment of the present disclosure.

Referring to FIG. 22, an image forming unit 1200 according to another embodiment of the present disclosure may include a first polarizing film 1210, a second polarizing film 1220, a first transparent plate 1230, a second transparent plate 1240, and a liquid crystal layer 1250.

The first transparent plate 1230 may be opposite to the second transparent plate 1240, and the first polarizing film 1210 and the second polarizing film 1220 may be disposed on the outer surface of the first transparent plate 1230 and the outer surface of the second transparent plate 1240, respectively. Also, the liquid crystal layer 1250 may be provided between the first transparent plate 1230 and the second transparent plate 1240.

At the lower edge part of the second transparent plate 1240, a plurality of cables 1260 may be provided. The cables 1260 may transmit image data from the power/control unit 160 (see FIG. 2) to the second transparent plate 1240, and may electrically connect to the second transparent plate 1240 at the lower edge part of the second transparent plate 1240.

Also, the second transparent plate 1240 may protrude downward rather than the first polarizing film 1210, the first transparent plate 1230, and the liquid crystal layer 1250 in order to connect to the cables 1260. For example, the lower edge 1210*a* of the first polarizing film 1210, the lower edge 1230*a* of the first transparent plate 1230, and the lower edge 1250*a* of the liquid crystal layer 550 may be aligned along a reference line RL, and the lower edge 1240*a* of the second transparent plate 1240 may protrude downward by about a first length D1 from the reference line RL.

Also, in order to prevent the protruded part of the second transparent plate 1240 and the cables 1260 from being shown to a user, a shading film 1270 may be provided below the first polarizing film 1210.

More specifically, the shading film 1270 may be provided between the lower edge 1210*a* of the first polarizing film 1210 and the front chassis 110. The width of the shading member 1270 may be a first length D1 that is the width of the protruded part of the second transparent plate 1240, or may be a second length D2 that is longer than the width of the protruded part of the second transparent plate 1240.

Since the shading film 1270 can block light, a user may not recognize the protruded part of the second transparent plate 1240 and the cables 1260.

A degree at which light is blocked by the first and second polarizing films 1210 and 1220 may be different from a degree at which light is blocked by the shading film 1270. Accordingly, a boundary line between a part in which light is blocked by the first and second polarizing films 1210 and 1220 and a part in which light is blocked by the shading film 1270 may be recognized by a user.

Accordingly, the shading film 1270 may be a material capable of blocking light to a degree at which light is blocked by the first and second polarizing films 1210 and 1220.

The shading film 1270 may be a black polymer film. For example, the shading film 1270 may be a black PET film, a black polyester film, a black PC film, a black PE film, or the like.

Such a black polymer film may show a color that is similar to that shown when light is blocked by the first and second polarizing films 1210 and 1220. Accordingly, if a block polymer film is used as the shading film 1270, the boundary line between the part in which light is blocked by the first and second polarizing films 1210 and 1220 and the part in which light is blocked by the shading film 1270 may be not recognized by a user.

Also, in order to support the shading film 1270, a support material 1290 may be filled between the shading film 1270 and the second transparent plate 1240.

The support material 1290 may support the shading film 1270, and may fix the cables 1260 on the second transparent plate 1240 so that the dummy film 1080 and the cables 1060 do not deviate from the second transparent plate 1240.

Also, in some cases, the support material 1290 may block light at an area in which the shading film 1270 is provided.

The support material 1290 may be silicon, poron, an adhesive, or the like. However, the support material 1290 may be any other material as long as it can support the shading member 1270.

As described above, in the display apparatus 100 including the front chassis 110 having no bezel, the second transparent plate 1240 included in the image forming unit 1200 may protrude downward to contact the cables 1260, and the shading film 1270 for blocking light may be provided to correspond to the protruded part of the second transparent plate 1240. As a result, a user may not recognize the protruded part of the second transparent plate 1240 and the cables 1260.

In the current embodiment, the second transparent plate 1240 may be provided behind the liquid crystal layer 1250, however, the second transparent plate 1240 may be provided in front of the liquid crystal layer 1250.

Also, in the current embodiment, the cables 1260 may be connected to the second transparent plate 1240 at the lower edge part of the image forming unit 1200, however, the cables 1260 may be connected to the second transparent plate 1240 at the upper, right, or left edge part of the image forming unit 1200.

Also, in the current embodiment, the second transparent plate 1240 may protrude downward, and the first polarizing film 1210 may also extend downward. However, the second transparent plate 1240 may protrude upward, rightward, or leftward according to the location of the cables 1260, and the first polarizing film 1210 may also extend upward, rightward, or leftward according to the direction in which the second transparent plate 1240 protrudes.

According to an aspect of the present disclosure, a bezel-less display apparatus may be provided.

According to another aspect of the present disclosure, a bezel-less display apparatus whose internal components are not shown to the outside may be provided.

According to still another embodiment of the present disclosure, a bezel-less display apparatus in which cables of connecting an image forming unit to a power/control unit are not shown to the outside may be provided.

Although a few embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:

1. A display apparatus, comprising:
   a main body having an opening at a front part;
   a backlight unit configured to generate light; and
   an image forming unit provided in the front part of the main body, the image forming unit being configured to one of block and transmit the light generated by the backlight unit to create an image,
   wherein the image forming unit comprises:
      a pair of transparent substrates disposed to be opposite to each other, a first transparent substrate of the pair of transparent substrates including an edge part which protrudes along a longitudinal axis of the first transparent substrate beyond a second transparent substrate of the pair of transparent substrates;
      a cable configured to transmit image data to the pair of transparent substrates, the cable being connected to the edge part of the first transparent substrate which protrudes; and
      a pair of polarizing films
      a first polarizing film of the pair of polarizing films disposed on an outer surface of the second transparent substrate, the first polarizing film including an extended part which extends along a longitudinal axis of the first polarizing film beyond a second polarizing film of the pair of polarizing films in a direction in which the first transparent substrate protrudes, the second polarizing film being disposed on an outer surface of the first transparent substrate,
   wherein the extended part of the first polarizing film extends by a first distance from an edge of the second transparent substrate and the first distance is greater than a second distance by which the edge part of the first transparent substrate protrudes from the edge of the second transparent substrate,
   wherein the image forming unit further comprises a subsidiary polarizing film attached on a surface of only the extended part of the first polarizing film, and a polarization direction of the subsidiary polarizing film is perpendicular to a polarization direction of the first polarizing film.

2. The display apparatus according to claim 1, wherein the image forming unit further comprises a support material disposed on the extended part of the first polarizing film, and configured to support the first polarizing film.

3. The display apparatus according to claim 2, wherein the support material fills space between a protruded part of the one transparent substrate and the extended part of the first polarizing film.

4. The display apparatus according to claim 1, wherein the image forming unit further comprises a dummy film disposed at an area where no cable contacts a protruded part of the first transparent substrate.

5. An image forming unit of a display, comprising:
   a pair of transparent substrates disposed opposite each other on each side of an LCD layer, a first transparent substrate of the pair of transparent substrates having a protruding edge;
   a cable connected to the protruding edge to transmit image data to the first transparent substrate of the pair of transparent substrates having the protruding edge; and
   a pair of polarizing films, a first polarizing film of the pair of polarizing films disposed on an outer surface of a second transparent substrate of the pair of transparent substrates and the first polarizing film including an extending edge which extends along a longitudinal axis of the first polarizing film beyond a second polarizing film of the pair of polarizing films in a direction in which the protruding edge of the first transparent substrate protrudes, the second polarizing film being disposed on an outer surface of the first transparent substrate,
   wherein the extended part of the first polarizing film extends by a first distance from an edge of the second transparent substrate and the first distance is greater than a second distance by which the edge part of the first transparent substrate protrudes from the edge of the second transparent substrate,
   wherein the extended part of the first polarizing film has a subsidiary film attached on a surface of only the extended part of the first polarizing film and a polarization of the subsidiary film is perpendicular to the polarization of the first polarizing film.

6. The image forming unit of a display according to claim 5, wherein the cable is visually obscured from a front of the image forming unit of the display by the extended part of the first polarizing film.

* * * * *